(12) United States Patent
Dai et al.

(10) Patent No.: US 11,366,289 B2
(45) Date of Patent: Jun. 21, 2022

(54) OPTICAL IMAGING SYSTEM

(71) Applicant: Zhejiang Sunny Optical Co., Ltd., Ningbo (CN)

(72) Inventors: Fujian Dai, Ningbo (CN); Lin Huang, Ningbo (CN); Yunbing Ji, Ningbo (CN)

(73) Assignee: Zhejiang Sunny Optical Co., Ltd., Ningbo (CN)

( * ) Notice: Subject to any disclaimer, the term of this patent is extended or adjusted under 35 U.S.C. 154(b) by 367 days.

(21) Appl. No.: 16/742,453

(22) Filed: Jan. 14, 2020

(65) Prior Publication Data
US 2021/0055516 A1 Feb. 25, 2021

(51) Int. Cl.
*G02B 9/64* (2006.01)
*G02B 13/00* (2006.01)

(52) U.S. Cl.
CPC ............ *G02B 9/64* (2013.01); *G02B 13/0045* (2013.01)

(58) Field of Classification Search
None
See application file for complete search history.

(56) References Cited

U.S. PATENT DOCUMENTS

| | | | |
|---|---|---|---|
| 6,115,194 A * | 9/2000 | Yoneyama | G02B 13/02 359/755 |
| 7,791,824 B2 * | 9/2010 | Yoneyama | G02B 13/02 359/748 |
| 2014/0293457 A1 * | 10/2014 | Su | G02B 9/64 359/757 |
| 2019/0285863 A1 * | 9/2019 | Yang | G02B 27/0025 |

* cited by examiner

*Primary Examiner* — Darryl J Collins
(74) *Attorney, Agent, or Firm* — Barnes & Thornburg LLP

(57) ABSTRACT

The present disclosure discloses an optical imaging system including, sequentially from an object side to an image side along an optical axis: a first lens, having a refractive power with a convex object-side surface; a second lens, having a positive refractive power; a third lens, having a refractive power; a fourth lens, having a refractive power; a fifth lens, having a negative refractive power with a convex image-side surface; a sixth lens, having a refractive power with a concave image-side surface; and a seventh lens, having a refractive power. An effective focal length f of the optical imaging system and an entrance pupil diameter EPD of the optical imaging system satisfy: f/EPD<1.5.

20 Claims, 14 Drawing Sheets

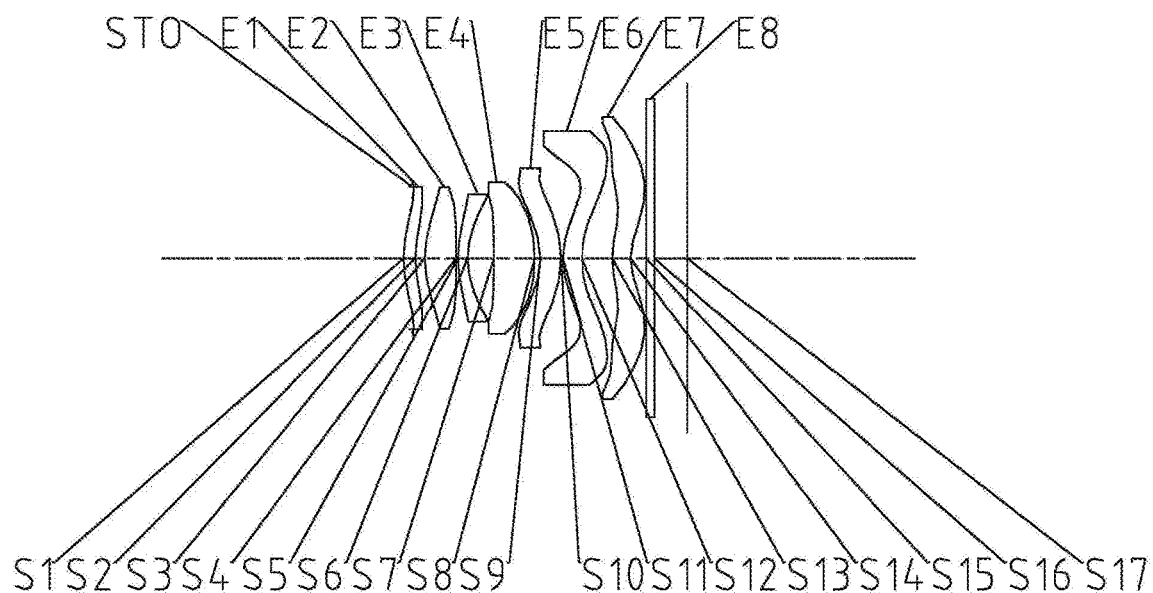
Fig. 13
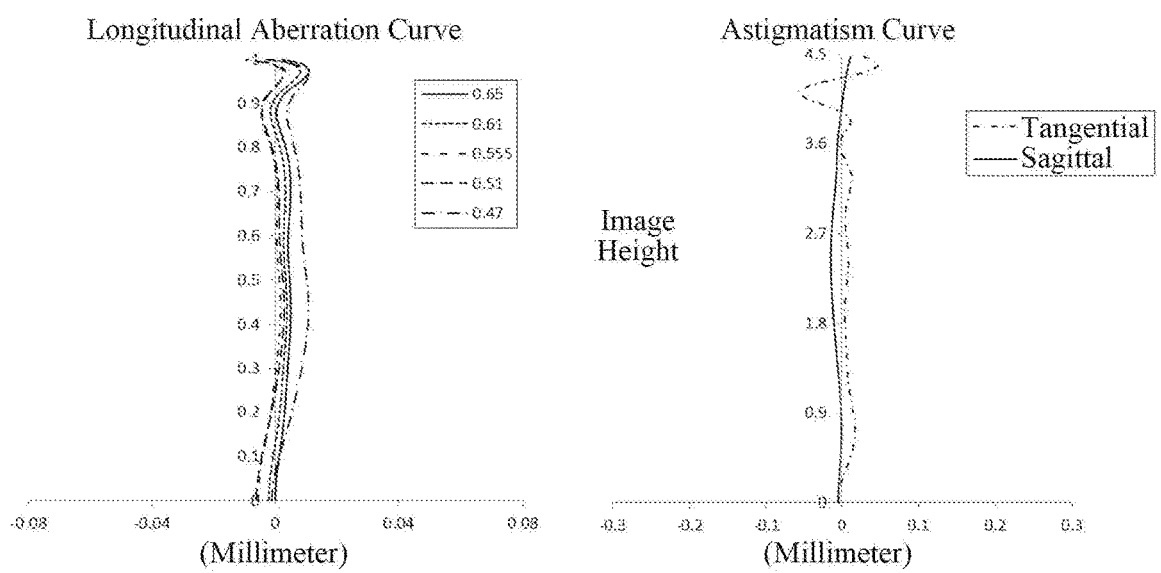
Fig. 14A
Fig. 14B

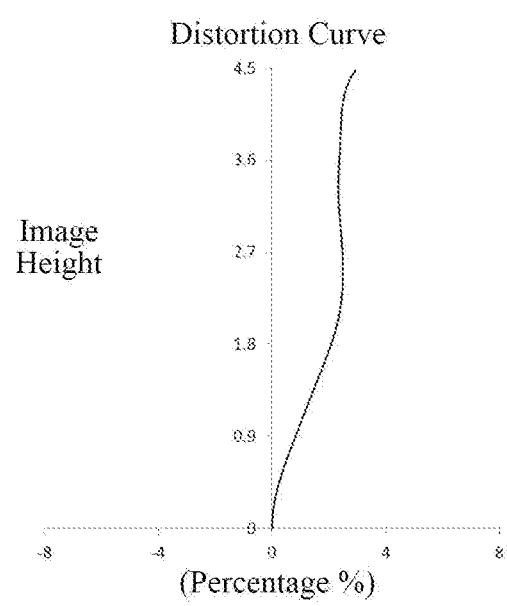
Fig. 18C
Fig. 18D

OPTICAL IMAGING SYSTEM

CROSS-REFERENCE TO RELATED APPLICATIONS

This application claims priority to Chinese Application No. 201910762703.0, filed on Aug. 19, 2019 and entitled "OPTICAL IMAGING system," the entire disclosure of which is hereby incorporated by reference.

TECHNICAL FIELD

The present disclosure relates to an optical imaging system, and more specifically to an optical imaging system including at least seven lenses.

BACKGROUND

In recent years, with the development of science and technology, the market demand for optical imaging systems suitable for portable electronic products has gradually increased. The rapid development of mobile phone camera modules, especially the popular application of high-pixel CMOS chips, has led mobile phone manufacturers to impose more stringent requirements on the image quality of optical imaging systems. In addition, with the improvement of the performance and the reduction of the size of CCD and CMOS components, higher requirements for a good image quality and miniaturization of corresponding imaging systems are also expected.

In order to meet the demand for miniaturization and imaging requirements, optical imaging systems capable of achieving miniaturization, high resolution, high pixel, bright field-of-view, and large field-of-view are required.

SUMMARY

The present disclosure provides an optical imaging system that is applicable to portable electronic products and at least solves or partially addresses at least one of the above disadvantages of the prior art.

The present disclosure provides an optical imaging system including a first lens, a second lens, a third lens, a fourth lens, a fifth lens, a sixth lens and a seventh lens, which are sequentially arranged from an object side of the optical imaging system to an image side of the optical imaging system along an optical axis of the optical imaging system. The a first lens has a refractive power, and an object-side surface thereof may be a convex surface. The second lens has a positive refractive power. The third lens has a refractive power. The fourth lens has a refractive power. The fifth lens has a negative refractive power, and an image-side surface thereof may be a convex surface. The sixth lens has a refractive power, and an image-side surface thereof may be a concave surface. The seventh lens has a refractive power.

In an implementation, an effective focal length f of the optical imaging system and an entrance pupil diameter EPD of the optical imaging system may satisfy: f/EPD<1.7. Alternatively, f/EPD<1.5.

In an implementation, a distance TTL on the optical axis from the object-side surface of the first lens to an image plane of the optical imaging system and the effective focal length f of the optical imaging system satisfy: 1.2<TTL/f<1.6.

In an implementation, the effective focal length f of the optical imaging system and an effective focal length f5 of the fifth lens satisfy: −0.51f/f5<0.

In an implementation, a spaced distance T12 on the optical axis between the first lens and the second lens and a spaced distance T23 on the optical axis between the second lens and the third lens satisfy: 0<T23/T12<1.

In an implementation, a central thickness CT2 of the second lens on the optical axis, a central thickness CT3 of the third lens on the optical axis, a central thickness CT4 of the fourth lens on the optical axis and the effective focal length f of the optical imaging system satisfy: 0.1<(CT2+CT3+CT4)/f<0.6.

In an implementation, a sum of central thicknesses ΣCT of the first lens to the seventh lens, and a distance TTL on the optical axis from the object-side surface of the first lens to an image plane of the optical imaging system satisfy: 0.3<ΣCT/TTL<0.7.

In an implementation, a radius of curvature R1 of the object-side surface of the first lens, a radius of curvature R2 of an image-side surface of the first lens, and an effective focal length f2 of the second lens satisfy: 0.2<f2/(R1+R2) ≤1.06.

In an implementation, a radius of curvature R9 of an object-side surface of the fifth lens and a radius of curvature R10 of the image-side surface of the fifth lens satisfy: 0.4<|R9/R10|<1.

In an implementation, half of a maximal field-of-view SemiFOV of the optical imaging system and the effective focal length f of the optical imaging system satisfy: 4.33 mm≤tan(SemiFOV)×f<4.8 mm.

In an implementation, half of a diagonal length ImgH of an effective pixel area on an image plane of the optical imaging system, a radius of curvature R5 of an object-side surface of the third lens and a radius of curvature R6 of an image-side surface of the third lens satisfy: 0.6<ImgH/|R5+R6|<1.3.

In an implementation, a distance SAG21 on the optical axis from an intersection of an object-side surface of the second lens and the optical axis to a vertex of an effective radius of the object-side surface of the second lens, and a distance SAG22 on the optical axis from an intersection of an image-side surface of the second lens and the optical axis to a vertex of an effective radius of the image-side surface of the second lens satisfy: SAG22/SAG21<−0.2.

The optical imaging system of the present disclosure employs seven lenses. By properly disposing lenses of different materials and properly assigning the refractive power and the surface shape of each lens, the central thickness of each lens, and the spaced distances on the optical axis between lenses, the optical imaging system described above may have at least one of the beneficial effects of miniaturization, high resolution, high pixel, bright field-of-view and large field-of-view and the like.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 13 is a schematic structural view of an optical imaging system according to embodiment 7 of the present disclosure;

FIG. 14A-14D illustrates a longitudinal aberration curve, an astigmatism curve, a distortion curve and a lateral color curve of the optical imaging system according to embodiment 7, respectively;

FIG. 18A-18D illustrates a longitudinal aberration curve, an astigmatism curve, a distortion curve and a lateral color curve of the optical imaging system according to embodiment 9, respectively.

DETAILED DESCRIPTION OF EMBODIMENTS

Figure 1:
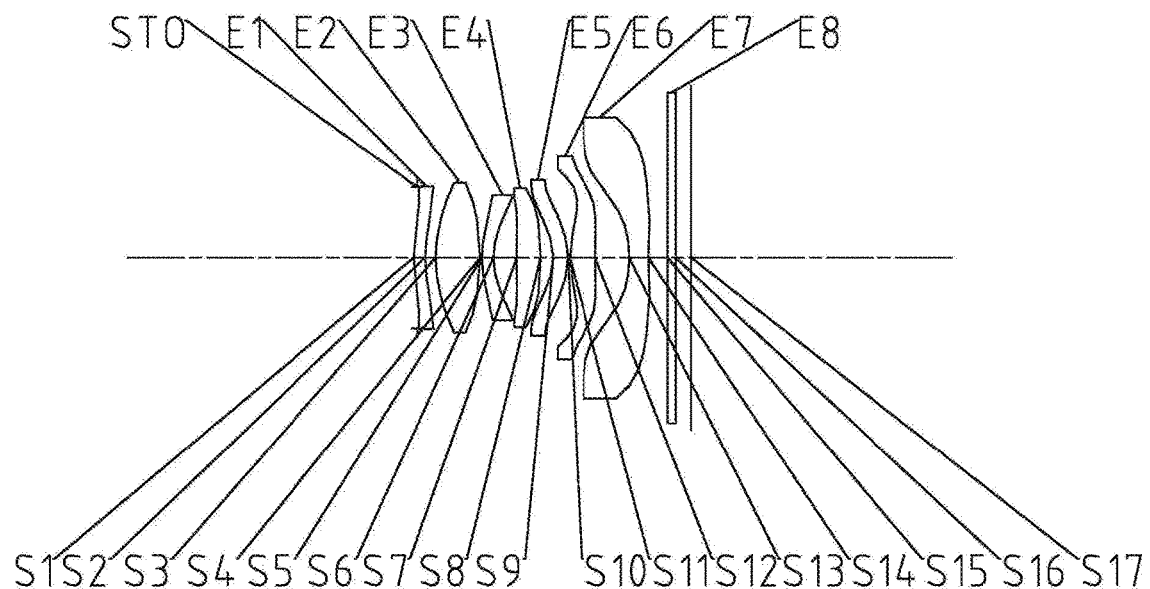
FIG. 1 is a schematic structural view of an optical imaging system according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the like reference numerals designate the like elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. In each lens, the surface closest to the object side is referred to as an object-side surface; and in each lens, the surface closest to the image side is referred to as an image-side surface.

It should be further understood that the terms "comprising," "including," "having", "containing" and/or "contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may", when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging system according to an exemplary implementation of the present disclosure includes, for example, seven lenses having refractive power, i.e. a first lens, a second lens, a third lens, a fourth lens, a fifth lens, a sixth lens and a seventh lens. The seven lenses are arranged sequentially from an object side to an image side along an optical axis. There may be an air gap between any two adjacent lenses among the first to the seven lenses.

In an exemplary implementation, the first lens has a positive refractive power or a negative refractive power, and an object-side surface thereof may be a convex surface; the second lens may have a positive refractive power; the third lens may have a positive refractive power or a negative refractive power; the fourth lens has a positive refractive power or a negative refractive power; the fifth lens may have a negative refractive power, and an image-side surface thereof may be a convex surface; the sixth lens has a positive refractive power or a negative refractive power, and an image-side surface thereof may be a concave surface; and the seventh lens has a positive refractive power or a negative refractive power. The aberration of the optical imaging system is effectively balanced and controlled by properly controlling the distribution of the positive refractive power and the negative refractive power for each component of the optical imaging system and the curvature of the surface of each lens, thereby improving the image quality of the optical imaging system.

In an exemplary implementation, the optical imaging system of the present disclosure may satisfy f/EPD<1.7, where f is an effective focal length of the optical imaging system, and EPD is an entrance pupil diameter of the optical imaging system. In an exemplary implementation, f and EPD may satisfy f/EPD<1.5. By controlling the ratio of the effective focal length to the entrance pupil diameter of the optical imaging system, the optical imaging system may have a large aperture while enabling a large amount of light to pass through, thereby reducing the aberration of the edge of the field-of-view and improving the image quality of the optical imaging system in a dark environment.

In an exemplary implementation, the optical imaging system of the present disclosure may satisfy SAG22/SAG21<−0.2, where SAG21 is a distance on the optical axis from an intersection of an object-side surface of the second lens and the optical axis to a vertex of an effective radius of the object-side surface of the second lens, and SAG22 is a distance on the optical axis from an intersection of an image-side surface of the second lens and the optical axis to a vertex of an effective radius of the image-side surface of the second lens.

More specifically, SAG21 and SAG22 may satisfy−1.20<SAG22/SAG21<−0.3. By controlling the sag of the two surfaces of the second lens, the shape of the second lens may be controlled to avoid excessive bending of the second lens, thereby reducing the difficulty of forming and processing the second lens, and further improving the optical imaging system in assembly stability.

In an exemplary implementation, the optical imaging system of the present disclosure may satisfy 1.2<TTL/f<1.6, where TTL is a distance on the optical axis from the object-side surface of the first lens to an image plane of the optical imaging system, and f is the effective focal length of the optical imaging system. More specifically, TTL and f may satisfy 1.30<TTL/f<1.45. By controlling the ratio of the optical total length to the effective focal length of the optical imaging system, the optical imaging system may have a shortened total length while having a good image quality, thereby facilitating miniaturization of the optical imaging system.

In an exemplary implementation, the optical imaging system of the present disclosure may satisfy −0.51≤f/f5<0, where f is the effective focal length of the optical imaging system, and f5 is an effective focal length of the fifth lens. More specifically, f and f5 may satisfy −0.511f/f<−0.12. By controlling the ratio of the effective focal length of the optical imaging system to the effective focal length of the fifth lens, the refractive power of the fifth lens may be effectively controlled, which in turns advantageously make the aberration of the optical imaging system more balanced, and also advantageously improve the resolution of the optical imaging system.

In an exemplary implementation, the optical imaging system of the present disclosure may satisfy 0<T23/T12<1, where T12 is a spaced distance on the optical axis between the first lens and the second lens, and T23 is a spaced distance on the optical axis between the second lens and the third lens. More specifically, T12 and T23 may satisfy 0.1<T23/T12<0.8. By controlling the air gap between the second lens and the lenses at both sides of the second lens, the following advantageous may be achieved: better processing and assembly the optical imaging system; avoiding interference between adjacent lenses due to small gaps between lenses when assembling the optical imaging system; and reducing the deflection of light from the first to the third lenses, which in turns adjusts the field curvature of the optical imaging system and reduces the sensitivity of the optical imaging system, thereby improving the image quality of the optical imaging system.

In an exemplary implementation, the optical imaging system of the present disclosure may satisfy 0.1<(CT2+CT3+CT4)/f<0.6, where CT2 is a central thickness of the second lens on the optical axis, CT3 is a central thickness of the third lens on the optical axis, CT4 is a central thickness of the fourth lens on the optical axis, and f is the effective focal length of the optical imaging system. More specifically, CT2, CT3, CT4 and f may satisfy 0.34<(CT2+CT3+CT4)/f<0.43. By controlling the central thickness of the second lens, and the central thickness of the third lens and the central thickness of the fourth lens to enable the sum of the three central thicknesses to be matched with the effective focal length of the optical imaging system, the image quality of the optical imaging system may be advantageously improved and the optical imaging system may advantageously have a better stability during assembly.

In an exemplary implementation, the optical imaging system of the present disclosure may satisfy 0.3<ΣCT/TTL<0.7, where ΣCT is a sum of central thicknesses of the first lens to the seventh lens, and TTL is a distance on the optical axis from the object-side surface of the first lens to an image plane of the optical imaging system. More specifically, ΣCT and TTL may satisfy 0.5<ΣCT/TTL<0.6. Controlling the central thickness of each lens allows the optical imaging system to have a good image quality, and also helps to shorten the length of the optical imaging system.

In an exemplary implementation, the optical imaging system of the present disclosure may satisfy 0.2<f2/(R1+R2) 1.06, where R1 is a radius of curvature of the object-side surface of the first lens, R2 is a radius of curvature of an image-side surface of the first lens, and f2 is an effective focal length of the second lens. More specifically, R1, R2 and f2 may satisfy 0.56<f2/(R1+R2)≤0.06. By controlling the radii of curvature of surfaces at both sides of the first lens and the effective focal length of the second lens, the light at the first lens may be advantageously transmitted smoothly and the amount of astigmatism of the optical imaging system may be effectively reduced.

In an exemplary implementation, the optical imaging system of the present disclosure may satisfy 0.4<|R9/R10|<1, where R9 is a radius of curvature of an object-side surface of the fifth lens, and R10 is a radius of curvature of the image-side surface of the fifth lens. More specifically, R9 and R10 may satisfy 0.60<|R9/R10|<0.85. By controlling the radii of curvature of surfaces at both sides of the fifth lens, the light at the fifth lens may be advantageously transmitted smoothly and the amount of astigmatism of the optical imaging system may be effectively reduced.

In an exemplary implementation, the optical imaging system of the present disclosure may satisfy 4.33 mm tan(SemiFOV)×f<4.8 mm, where SemiFOV is half of a maximal field-of-view of the optical imaging system, and f is the effective focal length of the optical imaging system. By controlling half of the maximal field-of-view and the effective focal length of the optical imaging system, the aberration of the optical imaging system may be advantageously reduced, and the imaging range on the image plane of the optical imaging system may also be effectively controlled, which in turns facilitates the matching of the optical imaging system with the photosensitive chip.

In an exemplary implementation, the optical imaging system of the present disclosure may satisfy 0.6<ImgH/|R5+R6|<1.3, where ImgH is half of a diagonal length of an effective pixel area on an image plane of the optical imaging system, R5 is a radius of curvature of an object-side surface of the third lens, and R6 is a radius of curvature of an image-side surface of the third lens. More specifically, ImgH, R5 and R6 may satisfy 0.80<ImgH/|R5+R6|<1.08. By controlling the radii of curvature of surfaces at both sides of the third lens, the light at the third lens may be advantageously transmitted smoothly, the aberration of the optical imaging system may be advantageously reduced and the resolution of the optical imaging system may be advantageously improved.

In an exemplary implementation, the optical imaging system described above may further include at least one diaphragm. The diaphragm may be disposed at an appropriate position as needed, for example, between the object side and the first lens. Alternatively, the optical imaging system described above may further include an optical filter for correcting color deviation and/or a protective glass for protecting photosensitive elements located on the image plane.

The optical imaging system according to the above implementations of the present disclosure may employ a plurality of lenses, for example, seven lenses described above. By properly disposing the refractive power, surface shape and the central thickness of each lens and the spaced distances on the optical axis between lenses, the size and the sensitivity of the optical imaging system may be effectively reduced, and the processability of the optical imaging system may be improved, which makes the optical imaging system more advantageous for production and processing and applicable to portable electronic products. In addition, the optical imaging system of the present disclosure also has excellent optical performances such as high pixel, high resolution, miniaturization, bright field-of-view and large field-of-view and the like.

In an implementations of the present disclosure, at least one of the surfaces of each lens is an aspheric surface, that is, at least one of the object-side surface of the first lens to the image-side surface of the seventh lens is an aspheric surface. The aspheric lens is characterize by a continuous change in curvature from the center to the periphery thereof. Unlike a spherical lens having a constant curvature from the center to the periphery thereof, an aspheric lens has a better characteristics in radius of curvature, and has the advantages of improved distorted aberration and astigmatic aberration. With the aspheric lens, the aberrations that occur during imaging may be eliminated as much as possible, thereby improving the image quality. Alternatively, at least one of the object-side surface and the image-side surface of each of the first lens, the second lens, the third lens, the fourth lens, the fifth lens, the sixth lens, and the seventh lens is an aspheric surface. Alternatively, both the object-side surface and the image-side surface of each of the first lens, the second lens, the third lens, the fourth lens, the fifth lens, the sixth lens, and the seventh lens are aspheric surfaces.

However, the one skilled in the art will understand that the numbers of lenses constituting the optical imaging system can be changed to obtain the various results and advantages described in the present disclosure without departing from the technical solutions to be protected herein. For example, although seven lenses have been described as an example in the implementations, the optical imaging system is not limited to including seven lenses. The optical imaging system may also include other numbers of lenses if desired.

Specific embodiments applicable to the optical imaging system of the above implementations will be further described below with reference to the accompanying drawings.

Embodiment 1

An optical imaging system according to embodiment 1 of the present disclosure is described below with reference to FIG. 1 to FIG. 2D. FIG. 1 is a schematic structural view of an optical imaging system according to embodiment 1 of the present disclosure.

As shown in FIG. 1, the optical imaging system according to an example implementation of the present disclosure includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane S17.

Table 1 shows the basic parameters of the optical imaging system of embodiment 1, wherein the units for the radius of curvature, the thickness/distance and the focal length are millimeter (mm).

TABLE 1

| Surface number | Surface type | Radius of curvature | Thickness/ distance | Material Refractive index | Abbe number | Focal length | Conic coefficient |
|---|---|---|---|---|---|---|---|
| OBJ | spherical | infinite | infinite | | | | |
| STO | spherical | infinite | −0.0993 | | | | |
| S1 | aspheric | 3.7098 | 0.3000 | 1.62 | 26.00 | −50.9 | 0.0000 |
| S2 | aspheric | 3.2193 | 0.2745 | | | | −26.0247 |
| S3 | aspheric | 3.6222 | 1.1592 | 1.55 | 56.11 | 4.16 | −1.6655 |
| S4 | aspheric | −5.4068 | 0.0500 | | | | −0.3781 |
| S5 | aspheric | 2.7160 | 0.3000 | 1.68 | 19.25 | −9.92 | −12.4877 |
| S6 | aspheric | 1.8481 | 0.6056 | | | | −1.0000 |
| S7 | aspheric | 16.1141 | 0.6225 | 1.55 | 56.11 | 14.54 | −24.6341 |
| S8 | aspheric | −15.4373 | 0.3342 | | | | −0.5482 |
| S9 | aspheric | −1.3943 | 0.3836 | 1.67 | 19.00 | −11.49 | −1.0000 |
| S10 | aspheric | −1.8873 | 0.0500 | | | | −1.0000 |
| S11 | aspheric | 2.4111 | 0.6677 | 1.55 | 56.11 | 5.00 | −7.6070 |
| S12 | aspheric | 18.7278 | 0.8911 | | | | 0.9421 |
| S13 | aspheric | −3.7483 | 0.5000 | 1.54 | 55.74 | −4.42 | −2.4134 |
| S14 | aspheric | 6.7710 | 0.5015 | | | | −0.7445 |
| S15 | spherical | infinite | 0.2100 | 1.52 | 64.17 | | |
| S16 | spherical | infinite | 0.4000 | | | | |
| S17 | spherical | infinite | | | | | |

In embodiment 1, the effective focal length f of the optical imaging system is 5.26 mm, a distance TTL on the optical axis from the object-side surface S1 of the first lens E1 to the image plane S17 is 7.25 mm, half of the diagonal length ImgH of an effective pixel area on the image plane S17 is 4.48 mm, and half of a maximal field-of-view SemiFOV is 41.09°.

In embodiment 1, the object-side surface and the image-side surface of anyone of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R(that is, the paraxial curvature c is reciprocal of the radius of curvature in the above Table 1); k is the conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S14 in embodiment 1.

TABLE 2

| Surface number | A4 | A6 | A8 | A10 | A12 | A14 | A16 | A18 | A20 |
|---|---|---|---|---|---|---|---|---|---|
| S1 | −3.2528E−02 | −4.0926E−03 | 7.1847E−04 | 9.8737E−04 | −4.2610E−04 | 5.2201E−05 | 1.4102E−05 | −5.4708E−06 | 4.9550E−07 |
| S2 | 5.4871E−02 | −8.6857E−02 | 5.8911E−02 | −2.5731E−02 | 7.5787E−03 | −1.3799E−03 | 1.3580E−04 | −5.4169E−06 | −6.0225E−09 |
| S3 | 3.4072E−03 | −5.3566E−03 | −7.0546E−04 | 2.0464E−03 | −8.0915E−04 | 1.5065E−04 | −1.5039E−05 | 7.7846E−07 | −1.6453E−08 |
| S4 | 3.1549E−02 | −3.5512E−02 | 2.1249E−02 | −9.2036E−03 | 2.8706E−03 | −6.0891E−04 | 8.1514E−05 | −6.1199E−06 | 1.9467E−07 |
| S5 | 3.2587E−02 | −2.4433E−02 | −3.1275E−03 | 1.1767E−02 | −7.7108E−03 | 2.7347E−03 | −5.6901E−04 | 6.4965E−05 | −3.1295E−06 |
| S6 | −7.2982E−02 | 6.9963E−02 | −6.9816E−02 | 4.7400E−02 | −2.0763E−02 | 5.7798E−03 | −9.8428E−04 | 9.3224E−05 | −3.7520E−06 |
| S7 | −3.0413E−02 | 1.4059E−02 | −1.6762E−02 | 2.0728E−02 | −1.7580E−02 | 9.2847E−03 | −2.9699E−03 | 5.2215E−04 | −3.8142E−05 |
| S8 | −3.5540E−02 | −2.1401E−03 | −1.6821E−03 | 9.5538E−03 | −7.0108E−03 | 2.3298E−03 | −4.0578E−04 | 3.6108E−05 | −1.2979E−06 |
| S9 | 1.7696E−01 | −2.1111E−01 | 1.9370E−01 | −1.1209E−01 | 4.2300E−02 | −1.0466E−02 | 1.6611E−03 | −1.5593E−04 | 6.6390E−06 |
| S10 | 7.6882E−02 | −1.1121E−01 | 1.1020E−01 | −6.3878E−02 | 2.3186E−02 | −5.3555E−03 | 7.7353E−04 | −6.4354E−05 | 2.3684E−06 |
| S11 | −1.2094E−02 | −2.7205E−02 | 2.6204E−02 | −1.5075E−02 | 5.1351E−03 | −1.0587E−03 | 1.2827E−04 | −8.2153E−06 | 2.0871E−07 |
| S12 | −7.6858E−03 | −1.4308E−02 | 4.7144E−03 | −1.6280E−03 | 5.0385E−04 | −8.6319E−05 | 7.6944E−06 | −3.3831E−07 | 5.7617E−09 |
| S13 | −5.9011E−02 | 1.0791E−02 | −1.4246E−03 | 7.5521E−04 | −2.1587E−04 | 3.0297E−05 | −2.2871E−06 | 8.9719E−08 | −1.4379E−09 |
| S14 | −5.4775E−02 | 1.4055E−02 | −1.8535E−03 | 1.0622E−04 | 1.7237E−07 | −2.5102E−07 | 5.0867E−10 | 6.6698E−10 | −1.7746E−11 |

Figures 2A, 2B:
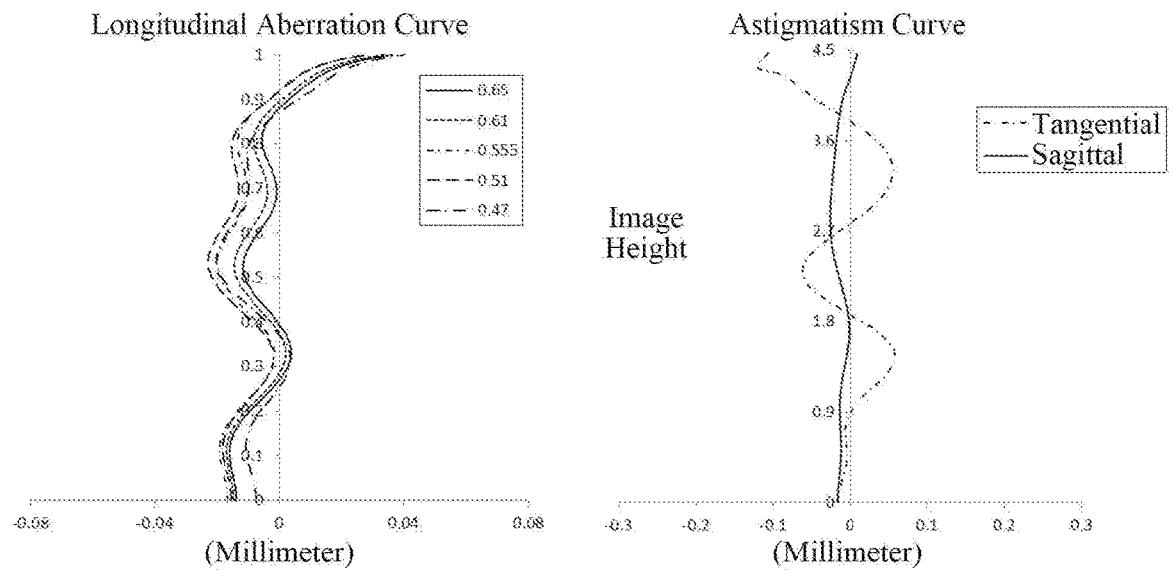
FIG. 2A-2D illustrates a longitudinal aberration curve, an astigmatism curve, a distortion curve and a lateral color curve of the optical imaging system according to embodiment 1, respectively.
Figures 2C, 2D:
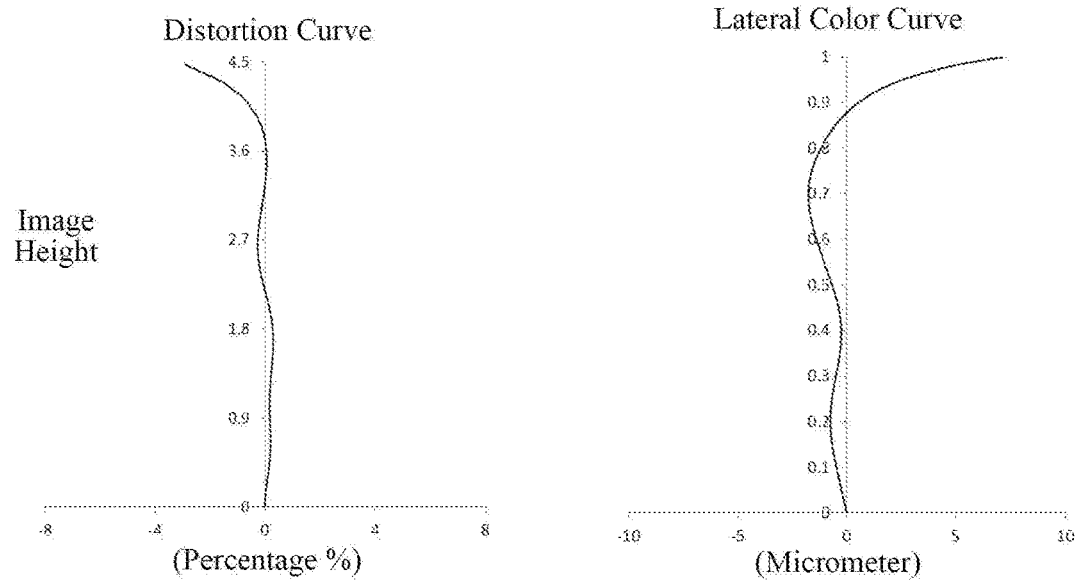

FIG. 2A illustrates a longitudinal aberration curve of the optical imaging system according to embodiment 1, representing deviations of focal points converged by light of different wavelengths after passing through the optical imaging system. FIG. 2B illustrates an astigmatism curve of the optical imaging system according to embodiment 1, representing a curvature of a tangential plane and a curvature of a sagittal plane. FIG. 2C illustrates a distortion curve of the optical imaging system according to embodiment 1, representing amounts of distortion corresponding to different image heights. FIG. 2D illustrates a lateral color curve of the optical imaging system according to embodiment 1, representing deviations of different image heights on an image plane after light passes through the optical imaging system. It can be seen from FIG. 2A to FIG. 2D that the optical imaging system provided in embodiment 1 may achieve a good image quality.

Embodiment 2

Figure 3:
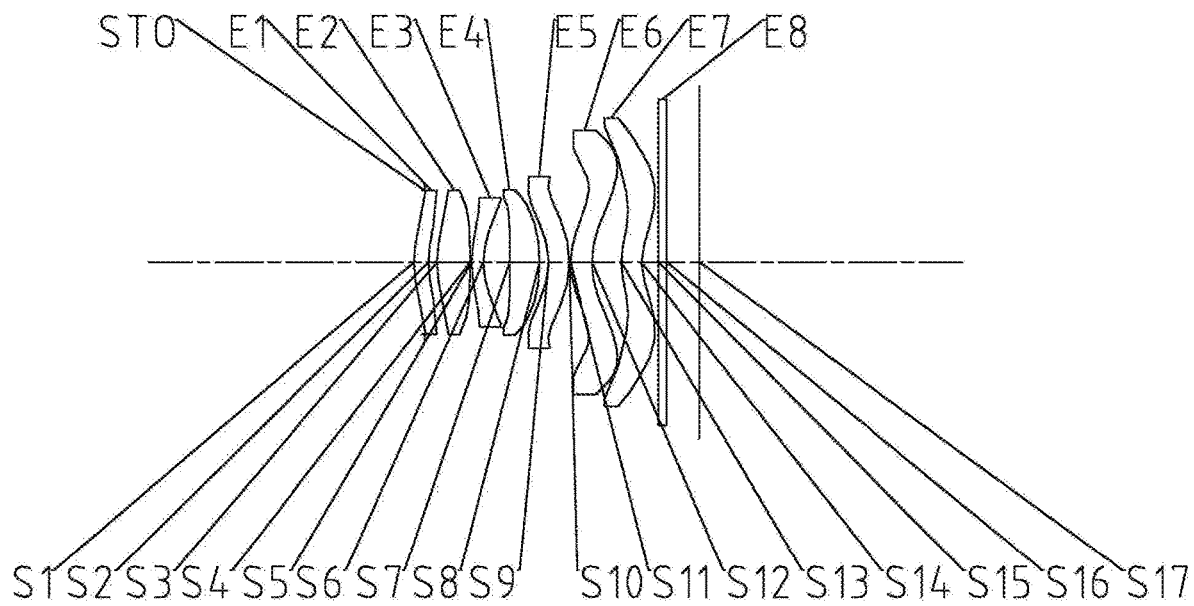
FIG. 3 is a schematic structural view of an optical imaging system according to embodiment 2 of the present disclosure.

An optical imaging system according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging system according to embodiment 2 of the present disclosure.

As shown in FIG. 3, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane 517.

In embodiment 2, the effective focal length f of the optical imaging system is 5.19 mm, a distance TTL on the optical axis from the object-side surface S1 of the first lens E1 to the image plane S17 is 7.30 mm, half of the diagonal length ImgH of an effective pixel area on the image plane S17 is 4.48 mm, and half of a maximal field-of-view SemiFOV is 40.82°.

Table 3 shows the basic parameters of the optical imaging system of embodiment 2, wherein the units for the radius of curvature, the thickness/distance and the focal length are millimeter (mm). Table 4 shows high-order coefficients applicable to each aspheric surface in embodiment 2, wherein the surface shape of each aspheric lens may be defined by formula (1) shown in the above embodiment 1.

TABLE 3

| Surface number | Surface type | Radius of curvature | Thickness/ distance | Material Refractive index | Abbe number | Focal length | Conic coefficient |
|---|---|---|---|---|---|---|---|
| OBJ | spherical | infinite | infinite | | | | |
| STO | spherical | infinite | −0.2699 | | | | |
| S1 | aspheric | 3.0945 | 0.3695 | 1.57 | 37.32 | −88.37 | −0.6766 |
| S2 | aspheric | 2.7890 | 0.2192 | | | | −0.6106 |
| S3 | aspheric | 3.0863 | 0.8491 | 1.55 | 56.11 | 4.94 | −0.0674 |
| S4 | aspheric | −19.2772 | 0.0350 | | | | 81.4373 |
| S5 | aspheric | 3.0057 | 0.3000 | 1.68 | 19.25 | −11.24 | −0.0939 |
| S6 | aspheric | 2.0680 | 0.6691 | | | | −0.0122 |
| S7 | aspheric | 98.9018 | 0.7640 | 1.55 | 56.11 | 8.90 | −99.0000 |
| S8 | aspheric | −5.0967 | 0.2312 | | | | −0.4240 |
| S9 | aspheric | −1.9639 | 0.5258 | 1.68 | 19.25 | −12.74 | −1.0338 |
| S10 | aspheric | −2.8171 | 0.0350 | | | | −0.7914 |
| S11 | aspheric | 1.9766 | 0.5614 | 1.55 | 56.11 | 12.15 | −1.4488 |
| S12 | aspheric | 2.5335 | 0.7444 | | | | −1.4338 |
| S13 | aspheric | 1.9234 | 0.5156 | 1.54 | 55.74 | −18.06 | −1.1171 |
| S14 | aspheric | 1.4547 | 0.4308 | | | | −1.0057 |
| S15 | spherical | infinite | 0.2100 | 1.52 | 64.17 | | |
| S16 | spherical | infinite | 0.8400 | | | | |
| S17 | spherical | infinite | | | | | |

TABLE 4

| Surface number | A4 | A6 | A8 | A10 | A12 | A14 | A16 | A18 | A20 |
|---|---|---|---|---|---|---|---|---|---|
| S1 | −2.0065E−02 | −1.2331E−03 | −2.4268E−03 | 4.6313E−03 | −4.2553E−03 | 2.1478E−03 | −6.1417E−04 | 9.5586E−05 | −6.3373E−06 |
| S2 | −4.0002E−02 | −1.2334E−02 | 6.4851E−03 | −6.5259E−03 | 1.6527E−03 | 1.6555E−03 | −6.9263E−04 | 1.3847E−04 | −1.0784E−05 |
| S3 | −1.6085E−02 | −1.3312E−02 | 3.3328E−03 | −1.1514E−03 | 5.3696E−04 | 3.9376E−04 | −3.4402E−04 | 8.5253E−05 | −7.0628E−06 |
| S4 | −7.4478E−03 | 1.5492E−02 | −3.6188E−02 | 3.3365E−02 | −1.7808E−02 | 5.9324E−03 | −1.2274E−03 | 1.4498E−04 | −7.4398E−06 |
| S5 | −5.9500E−02 | 3.2658E−02 | −3.1429E−02 | 1.9106E−02 | −5.1592E−03 | −7.2910E−04 | 8.5367E−04 | −2.0341E−04 | 1.6505E−05 |
| S6 | −6.5301E−02 | 2.3470E−02 | −9.2232E−03 | −3.5203E−03 | 7.3551E−03 | −4.8621E−03 | 1.6600E−03 | −2.8967E−04 | 2.0287E−05 |
| S7 | −1.6852E−02 | 9.9995E−03 | −1.6735E−02 | 1.6624E−02 | −1.1342E−02 | 5.0933E−03 | −1.4780E−03 | 2.4559E−04 | −1.7517E−05 |
| S8 | −4.5086E−02 | 2.1695E−02 | −1.1722E−02 | 5.0409E−03 | −1.1441E−03 | −1.0205E−04 | 1.2530E−04 | −2.8798E−05 | 2.3091E−06 |
| S9 | 1.7563E−02 | −3.0816E−03 | 4.3984E−03 | 3.5023E−04 | −2.1646E−03 | 1.4458E−03 | −4.5156E−04 | 6.8860E−05 | −4.1517E−06 |
| S10 | −2.0785E−02 | 1.6390E−02 | −5.6947E−03 | 2.0526E−03 | −6.9707E−04 | 1.8045E−04 | −2.1391E−05 | 7.3469E−08 | 1.0788E−07 |
| S11 | −3.5288E−02 | 1.7338E−02 | −1.1885E−02 | 4.4250E−03 | −1.0559E−03 | 1.6221E−04 | −1.5215E−05 | 7.9114E−07 | −1.7530E−08 |

TABLE 4-continued

| Surface number | A4 | A6 | A8 | A10 | A12 | A14 | A16 | A18 | A20 |
|---|---|---|---|---|---|---|---|---|---|
| S12 | 1.0929E−02 | −6.0528E−03 | −2.2474E−03 | 1.5380E−03 | −3.9204E−04 | 5.6424E−05 | −4.8060E−06 | 2.2505E−07 | −4.4441E−09 |
| S13 | −1.4211E−01 | 4.4504E−02 | −1.2054E−02 | 2.8189E−03 | −4.8744E−04 | 5.6415E−05 | −4.0916E−06 | 1.6760E−07 | −2.9495E−09 |
| S14 | −1.5633E−01 | 5.5132E−02 | −1.6679E−02 | 3.7397E−03 | −5.8485E−04 | 6.0559E−05 | −3.8930E−06 | 1.3941E−07 | −2.1151E−09 |

Figure 4A:
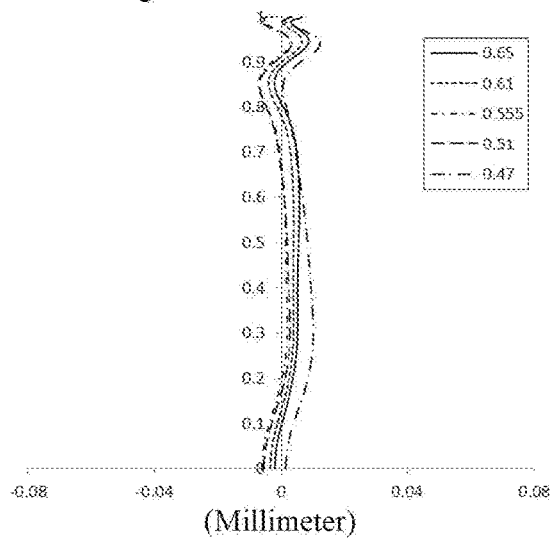
FIG. 4A-4D illustrates a longitudinal aberration curve, an astigmatism curve, a distortion curve and a lateral color curve of the optical imaging system according to embodiment 2, respectively.
Figure 4B:
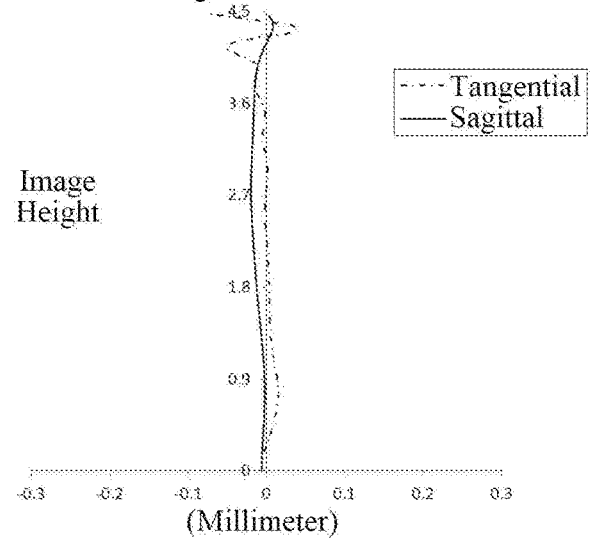
Figure 4C:
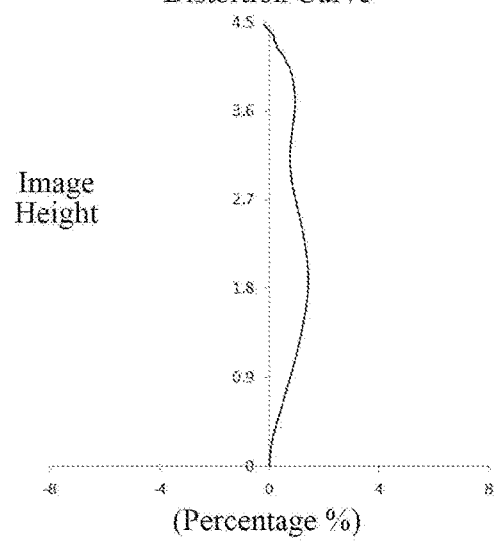
Figure 4D:
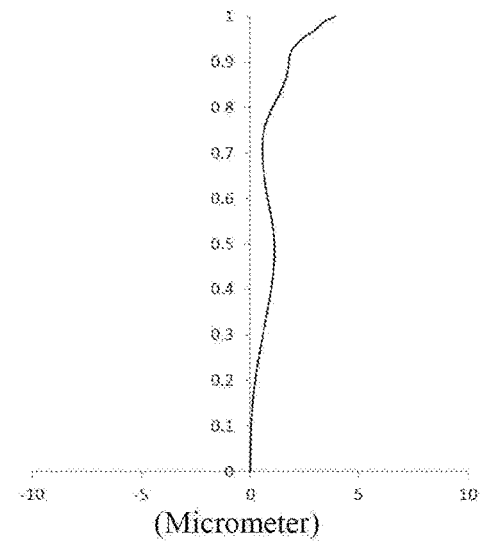

FIG. 4A illustrates a longitudinal aberration curve of the optical imaging system according to embodiment 2, representing deviations of focal points converged by light of different wavelengths after passing through the optical imaging system. FIG. 4B illustrates an astigmatism curve of the optical imaging system according to embodiment 2, representing a curvature of a tangential plane and a curvature of a sagittal plane. FIG. 4C illustrates a distortion curve of the optical imaging system according to embodiment 2, representing amounts of distortion corresponding to different image heights. FIG. 4D illustrates a lateral color curve of the optical imaging system according to embodiment 2, representing deviations of different image heights on an image plane after light passes through the optical imaging system. It can be seen from FIG. 4A to FIG. 4D that the optical imaging system provided in embodiment 2 may achieve a good image quality.

Embodiment 3

Figure 5:
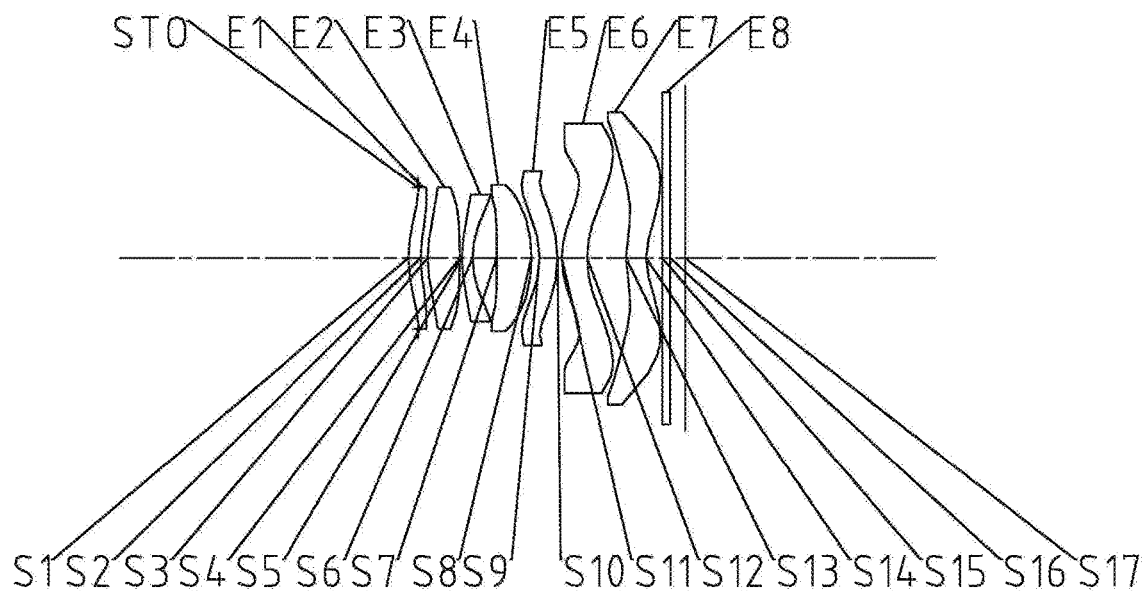
FIG. 5 is a schematic structural view of an optical imaging system according to embodiment 3 of the present disclosure.

An optical imaging system according to embodiment 3 of the present disclosure is described below with reference to FIG. 5 to FIG. 6D. FIG. 5 is a schematic structural view of the optical imaging system according to embodiment 3 of the present disclosure.

As shown in FIG. 5, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane 517.

In embodiment 3, the effective focal length f of the optical imaging system is 5.14 mm, a distance TTL on the optical axis from the object-side surface S1 of the first lens E1 to the image plane S17 is 7.28 mm, half of the diagonal length ImgH of an effective pixel area on the image plane S17 is 4.48 mm, and half of a maximal field-of-view SemiFOV is 40.21°.

Table 5 shows the basic parameters of the optical imaging system of embodiment 3, wherein the units for the radius of curvature, the thickness/distance and the focal length are millimeter (mm). Table 6 shows high-order coefficients applicable to each aspheric surface in embodiment 3, wherein the surface shape of each aspheric lens may be defined by formula (1) shown in the above embodiment 1.

TABLE 5

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | infinite | | | | |
| STO | spherical | infinite | −0.2514 | | | | |
| S1 | aspheric | 3.1656 | 0.3221 | 1.57 | 37.32 | 500.14 | −0.7366 |
| S2 | aspheric | 3.0828 | 0.1863 | | | | −0.5772 |
| S3 | aspheric | 3.3308 | 0.8427 | 1.55 | 56.11 | 5.34 | 0.0738 |
| S4 | aspheric | −21.4175 | 0.0500 | | | | 78.0960 |
| S5 | aspheric | 2.9438 | 0.2808 | 1.68 | 19.25 | −11.34 | 0.0362 |
| S6 | aspheric | 2.0464 | 0.6331 | | | | 0.0064 |
| S7 | aspheric | −2228.2708 | 0.9125 | 1.55 | 56.11 | 8.70 | −99.0000 |
| S8 | aspheric | −4.7413 | 0.2176 | | | | −0.9086 |
| S9 | aspheric | −2.2173 | 0.4686 | 1.68 | 19.25 | −12.34 | −0.9490 |
| S10 | aspheric | −3.2753 | 0.1106 | | | | −0.6579 |
| S11 | aspheric | 2.0304 | 0.6842 | 1.55 | 56.11 | 10.62 | −1.4406 |
| S12 | aspheric | 2.7531 | 1.0186 | | | | −1.4117 |
| S13 | aspheric | 2.6704 | 0.5263 | 1.54 | 55.74 | −10.51 | −0.9737 |
| S14 | aspheric | 1.6880 | 0.4224 | | | | −0.9857 |
| S15 | spherical | infinite | 0.2100 | 1.52 | 64.17 | | |

TABLE 5-continued

| Surface number | Surface type | Radius of curvature | Thickness/ distance | Material Refractive index | Abbe number | Focal length | Conic coefficient |
|---|---|---|---|---|---|---|---|
| S16 | spherical | infinite | 0.3941 | | | | |
| S17 | spherical | infinite | | | | | |

TABLE 6

| Surface number | A4 | A6 | A8 | A10 | A12 | A14 | A16 | A18 | A20 |
|---|---|---|---|---|---|---|---|---|---|
| S1 | −2.0884E−02 | 1.3456E−03 | −4.1960E−03 | 3.8487E−03 | −2.3652E−03 | 8.1411E−04 | −1.3333E−04 | 7.3141E−06 | 2.0709E−07 |
| S2 | −4.4945E−02 | 3.7863E−04 | −8.5044E−03 | 1.0357E−02 | −6.0697E−03 | 2.2632E−03 | −5.2248E−04 | 6.6661E−05 | −3.4462E−06 |
| S3 | −2.0441E−02 | −9.0679E−03 | 3.0597E−03 | −3.5181E−03 | 3.9709E−03 | −1.8932E−03 | 4.5026E−04 | −5.5883E−05 | 3.1454E−06 |
| S4 | −4.1238E−03 | 3.9577E−03 | −1.5504E−02 | 1.2828E−02 | −4.9167E−03 | 6.6404E−04 | 1.2896E−04 | −5.4152E−05 | 5.2327E−06 |
| S5 | −5.5354E−02 | 2.3074E−02 | −2.1690E−02 | 1.4692E−02 | −5.3311E−03 | 5.1065E−04 | 2.7350E−04 | −8.9350E−05 | 8.0776E−06 |
| S6 | −6.3329E−02 | 2.2512E−02 | −1.4030E−02 | 5.5696E−03 | −1.9620E−04 | −1.2096E−03 | 6.2426E−04 | −1.3229E−04 | 1.0541E−05 |
| S7 | −1.4395E−02 | 7.7279E−03 | −1.4287E−02 | 1.4774E−02 | −9.7727E−03 | 3.9725E−03 | −9.6541E−04 | 1.2285E−04 | −5.9981E−06 |
| S8 | −3.1783E−02 | −3.4070E−03 | 7.1454E−03 | −9.2314E−04 | −8.4190E−04 | 1.4922E−04 | 7.6404E−05 | −2.7269E−05 | 2.4477E−06 |
| S9 | 4.4734E−02 | −6.1276E−02 | 5.9532E−02 | −2.9829E−02 | 8.6637E−03 | −1.4249E−03 | 1.1352E−04 | −1.4714E−06 | −2.2917E−07 |
| S10 | −2.0401E−03 | −1.5896E−02 | 2.4895E−02 | −1.5795E−02 | 6.0155E−03 | −1.4577E−03 | 2.2326E−04 | −1.9710E−05 | 7.5688E−07 |
| S11 | −4.7527E−02 | 1.9479E−02 | −8.4552E−03 | 2.0962E−03 | −2.9604E−07 | 8.0258E−06 | 2.5487E−06 | −2.9604E−07 | 9.6968E−09 |
| S12 | 4.6449E−03 | −6.6775E−03 | 1.0532E−03 | −1.5068E−05 | −2.1407E−05 | 4.1287E−06 | −3.9264E−07 | 1.9459E−08 | −3.9266E−10 |
| S13 | −1.0291E−01 | 2.4255E−02 | −4.3262E−03 | 5.8430E−04 | −4.3163E−05 | 2.0911E−07 | 1.9215E−07 | −1.1614E−08 | 2.1331E−10 |
| S14 | −1.1409E−01 | 3.4444E−02 | −8.7443E−03 | 1.6562E−03 | −2.2471E−04 | 2.0658E−05 | −1.1998E−06 | 3.9347E−08 | −5.5228E−10 |

Figures 6A, 6B:
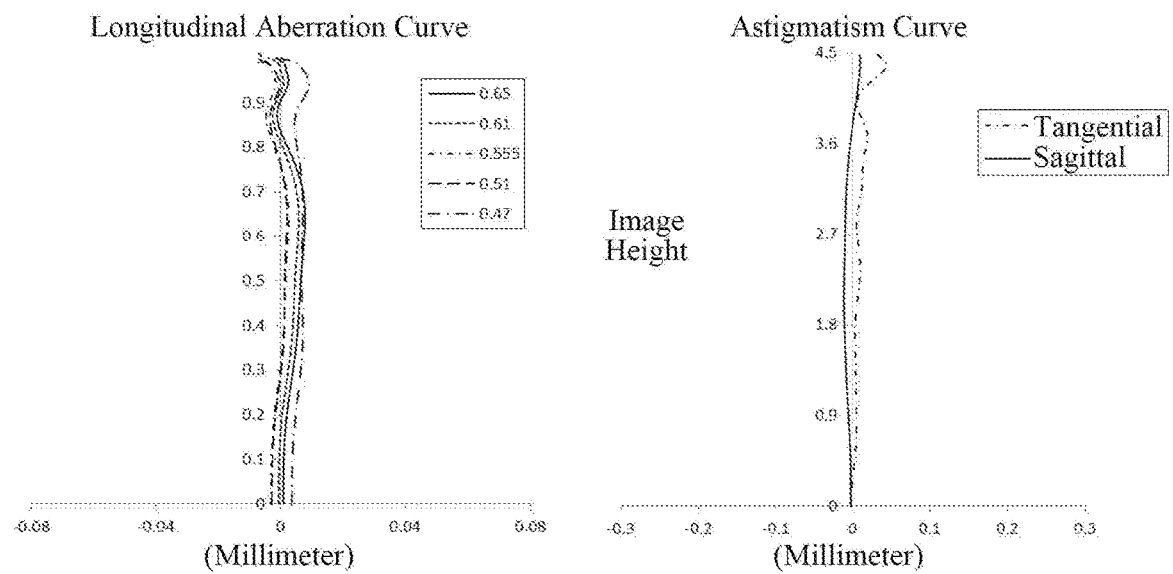
FIG. 6A-6D illustrates a longitudinal aberration curve, an astigmatism curve, a distortion curve and a lateral color curve of the optical imaging system according to embodiment 3, respectively.
Figures 6C, 6D:
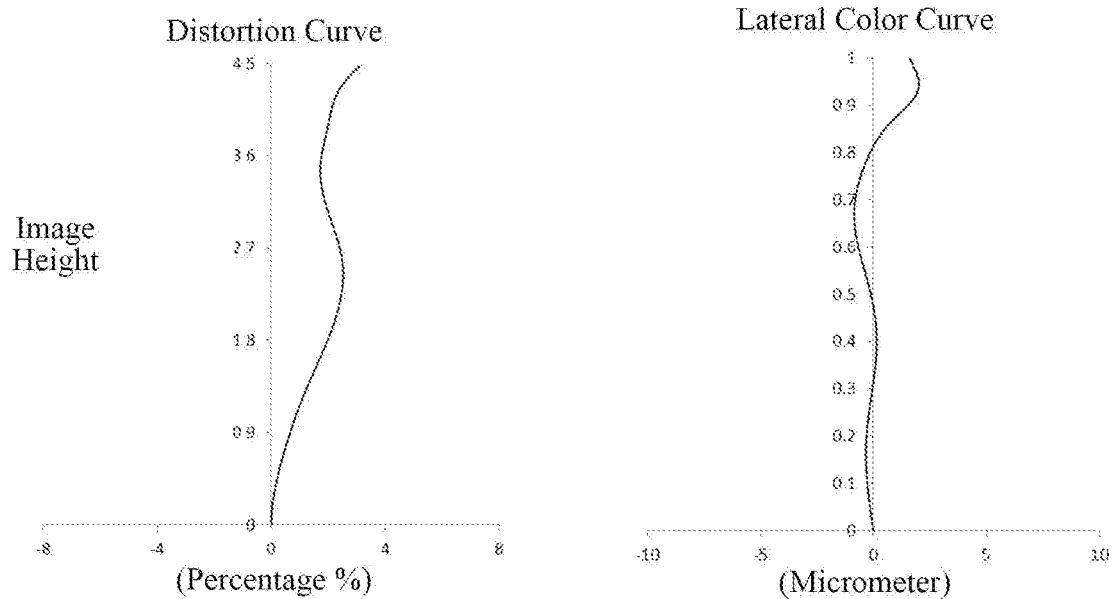

FIG. 6A illustrates a longitudinal aberration curve of the optical imaging system according to embodiment 3, representing deviations of focal points converged by light of different wavelengths after passing through the optical imaging system. FIG. 6B illustrates an astigmatism curve of the optical imaging system according to embodiment 3, representing a curvature of a tangential plane and a curvature of a sagittal plane. FIG. 6C illustrates a distortion curve of the optical imaging system according to embodiment 3, representing amounts of distortion corresponding to different image heights. FIG. 6D illustrates a lateral color curve of the optical imaging system according to embodiment 3, representing deviations of different image heights on an image plane after light passes through the optical imaging system. It can be seen from FIG. 6A to FIG. 6D that the optical imaging system provided in embodiment 3 may achieve a good image quality.

Embodiment 4

Figure 7:
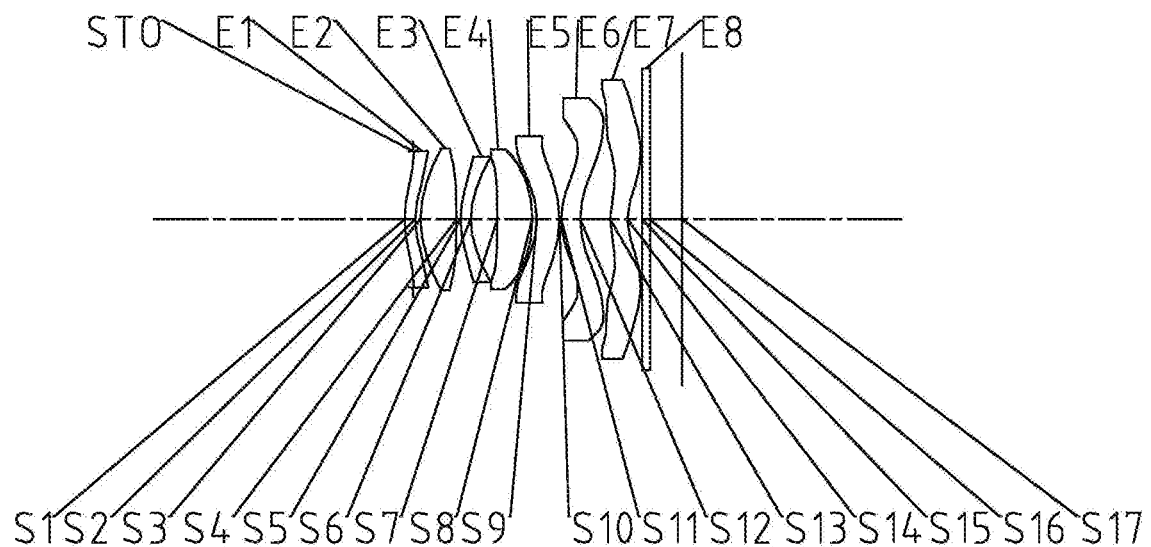
FIG. 7 is a schematic structural view of an optical imaging system according to embodiment 4 of the present disclosure.

An optical imaging system according to embodiment 4 of the present disclosure is described below with reference to FIG. 7 to FIG. 8D. FIG. 7 is a schematic structural view of the optical imaging system according to embodiment 4 of the present disclosure.

As shown in FIG. 7, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane S17.

In embodiment 4, the effective focal length f of the optical imaging system is 5.24 mm, a distance TTL on the optical axis from the object-side surface S1 of the first lens E1 to the image plane S17 is 7.29 mm, half of the diagonal length ImgH of an effective pixel area on the image plane S17 is 4.38 mm, and half of a maximal field-of-view SemiFOV is 39.86°.

Table 7 shows the basic parameters of the optical imaging system of embodiment 4, wherein the units for the radius of curvature, the thickness/distance and the focal length are millimeter (mm). Table 8 shows high-order coefficients applicable to each aspheric surface in embodiment 4, wherein the surface shape of each aspheric lens may be defined by formula (1) shown in the above embodiment 1.

TABLE 7

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | infinite | | | | |
| STO | spherical | infinite | −0.2225 | | | | |
| S1 | aspheric | 2.9465 | 0.2800 | 1.57 | 37.32 | −20.86 | −1.0920 |
| S2 | aspheric | 2.2802 | 0.1363 | | | | −0.6865 |
| S3 | aspheric | 2.8150 | 0.9455 | 1.55 | 56.11 | 5.55 | 0.3237 |
| S4 | aspheric | 34.6981 | 0.1030 | | | | −99.0000 |
| S5 | aspheric | 2.1333 | 0.2708 | 1.68 | 19.25 | 500.12 | −0.1535 |
| S6 | aspheric | 2.0368 | 0.6965 | | | | 0.0182 |
| S7 | aspheric | −46.3541 | 0.9188 | 1.55 | 56.11 | 7.65 | 84.7944 |
| S8 | aspheric | −3.8589 | 0.1253 | | | | −0.9316 |
| S9 | aspheric | −2.0792 | 0.5884 | 1.68 | 19.25 | −10.37 | −0.9218 |
| S10 | aspheric | −3.2904 | 0.0500 | | | | −0.6276 |
| S11 | aspheric | 2.0241 | 0.4996 | 1.55 | 56.11 | 12.51 | −1.4146 |
| S12 | aspheric | 2.6260 | 0.7819 | | | | −1.3387 |
| S13 | aspheric | 2.1306 | 0.4549 | 1.54 | 55.74 | −11.16 | −0.9453 |
| S14 | aspheric | 1.4543 | 0.3849 | | | | −0.9515 |
| S15 | spherical | infinite | 0.2100 | 1.52 | 64.17 | | |
| S16 | spherical | infinite | 0.8400 | | | | |
| S17 | spherical | infinite | | | | | |

TABLE 8

| Surface number | A4 | A6 | A8 | A10 | A12 | A14 | A16 | A18 | A20 |
|---|---|---|---|---|---|---|---|---|---|
| S1 | −3.1247E−02 | 6.3397E−03 | −1.5700E−02 | 1.9440E−02 | −1.3970E−02 | 6.1206E−03 | −1.6004E−03 | 2.2980E−04 | −1.3982E−05 |
| S2 | −4.4358E−02 | 1.1003E−02 | −3.7438E−02 | 4.6864E−02 | −3.3843E−02 | 1.5426E−02 | −4.2900E−03 | 6.6027E−04 | −4.3026E−05 |
| S3 | −1.0454E−02 | 6.4656E−03 | −2.6398E−02 | 2.9357E−02 | −1.9512E−02 | 8.3473E−03 | −2.1911E−03 | 3.1643E−04 | −1.9069E−05 |
| S4 | −1.0021E−01 | 1.4072E−01 | −1.5291E−01 | 1.1671E−01 | −6.1697E−02 | 2.1885E−02 | −4.9229E−03 | 6.2971E−04 | −3.4598E−05 |
| S5 | −1.2374E−01 | 9.6847E−02 | −8.6298E−02 | 5.6124E−02 | −2.5543E−02 | 8.0323E−03 | −1.6662E−03 | 2.0293E−04 | −1.0798E−05 |
| S6 | −4.9813E−02 | −1.4078E−02 | 4.3815E−02 | −5.4461E−02 | 4.0630E−02 | −1.9004E−02 | 5.4437E−03 | −8.7556E−04 | 6.0572E−05 |
| S7 | −8.4034E−03 | 2.2512E−04 | −4.9459E−03 | 6.9230E−03 | −6.0689E−03 | 2.9181E−03 | −8.1127E−04 | 1.1678E−04 | −5.8404E−06 |
| S8 | −3.4234E−02 | 2.4960E−02 | −3.9628E−02 | 3.5255E−02 | −1.6177E−02 | 3.6700E−03 | −2.7545E−04 | −3.4009E−05 | 5.4685E−06 |
| S9 | 2.7841E−02 | 1.7689E−04 | −2.9707E−02 | 3.8902E−02 | −2.3115E−02 | 7.8026E−03 | −1.5453E−03 | 1.6764E−04 | −7.7075E−06 |
| S10 | −1.2884E−02 | 1.2185E−02 | −6.7842E−03 | 4.2318E−03 | −1.8718E−03 | 5.5417E−04 | −1.0113E−04 | 1.0128E−05 | −4.2600E−07 |
| S11 | −3.4509E−02 | 1.5048E−02 | −1.2067E−02 | 5.2783E−03 | −1.4737E−03 | 2.6454E−04 | −2.9587E−05 | 1.8951E−06 | −5.3259E−08 |
| S12 | 1.5739E−02 | −1.3967E−02 | 1.2949E−03 | 8.2027E−04 | −3.6186E−04 | 7.1650E−05 | −7.7783E−06 | 4.3970E−07 | −1.0055E−08 |
| S13 | −1.4242E−01 | 3.5075E−02 | −5.8669E−03 | 6.4787E−04 | −2.2057E−06 | −1.0400E−05 | 1.3039E−06 | −6.6168E−08 | 1.2471E−09 |
| S14 | −1.5815E−01 | 5.1016E−02 | −1.3496E−02 | 2.6162E−03 | −3.5429E−04 | 3.2304E−05 | −1.8709E−06 | 6.1607E−08 | −8.7271E−10 |

Figure 8A:
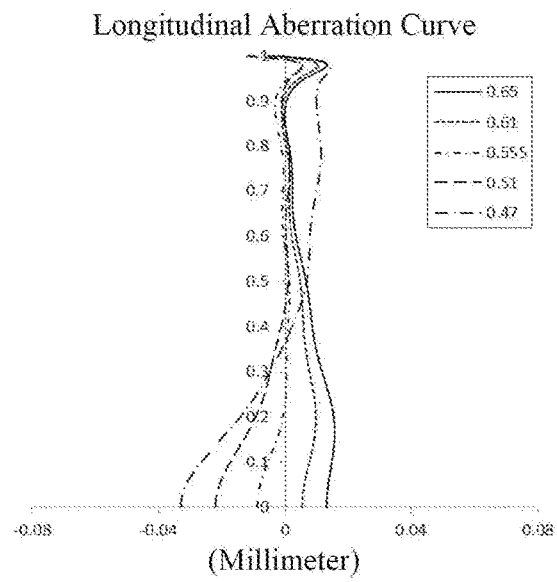
FIG. 8A-8D illustrates a longitudinal aberration curve, an astigmatism curve, a distortion curve and a lateral color curve of the optical imaging system according to embodiment 4, respectively.
Figure 8B:
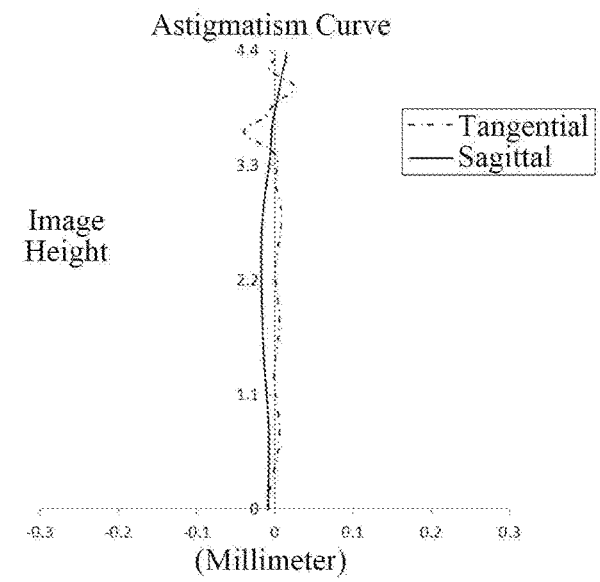
Figure 8C:
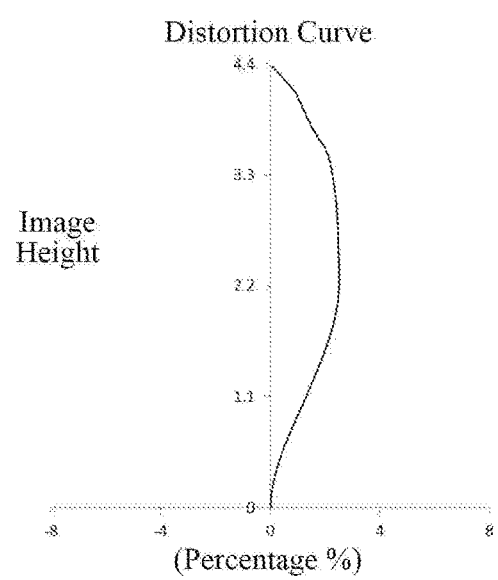
Figure 8D:
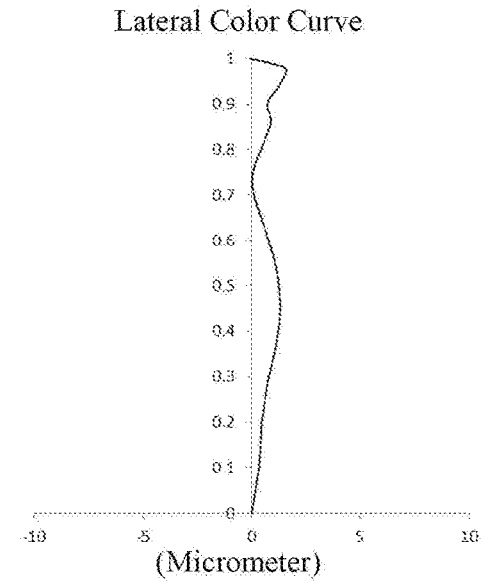

FIG. 8A illustrates a longitudinal aberration curve of the optical imaging system according to embodiment 4, representing deviations of focal points converged by light of different wavelengths after passing through the optical imaging system. FIG. 8B illustrates an astigmatism curve of the optical imaging system according to embodiment 4, representing a curvature of a tangential plane and a curvature of a sagittal plane. FIG. 8C illustrates a distortion curve of the optical imaging system according to embodiment 4, representing amounts of distortion corresponding to different image heights. FIG. 8D illustrates a lateral color curve of the optical imaging system according to embodiment 4, representing deviations of different image heights on an image plane after light passes through the optical imaging system. It can be seen from FIG. 8A to FIG. 8D that the optical imaging system provided in embodiment 4 may achieve a good image quality.

Embodiment 5

Figure 9:
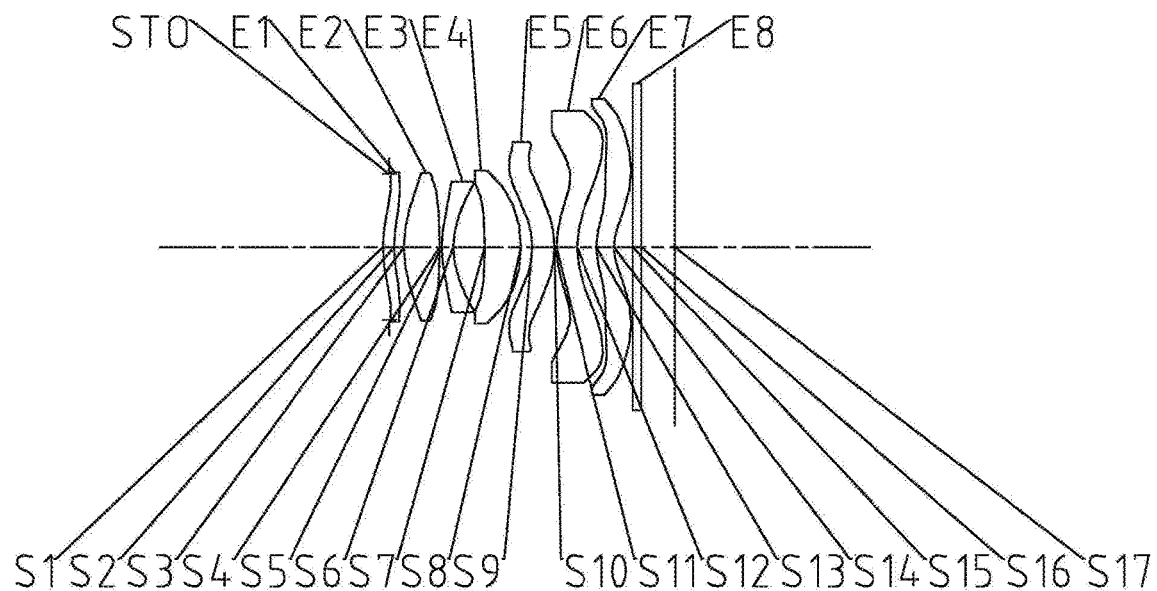
FIG. 9 is a schematic structural view of an optical imaging system according to embodiment 5 of the present disclosure.

An optical imaging system according to embodiment 5 of the present disclosure is described below with reference to FIG. 9 to FIG. 10D. FIG. 9 is a schematic structural view of the optical imaging system according to embodiment 5 of the present disclosure.

As shown in FIG. 9, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane S17.

In embodiment 5, the effective focal length f of the optical imaging system is 5.25 mm, a distance TTL on the optical axis from the object-side surface S1 of the first lens E1 to the image plane S17 is 7.32 mm, half of the diagonal length ImgH of an effective pixel area on the image plane S17 is 4.48 mm, and half of a maximal field-of-view SemiFOV is 39.53°.

Table 9 shows the basic parameters of the optical imaging system of embodiment 5, wherein the units for the radius of curvature, the thickness/distance and the focal length are millimeter (mm). Table 10 shows high-order coefficients applicable to each aspheric surface in embodiment 5, wherein the surface shape of each aspheric lens can be defined by formula (1) shown in the above embodiment 1.

Figures 10A, 10B:
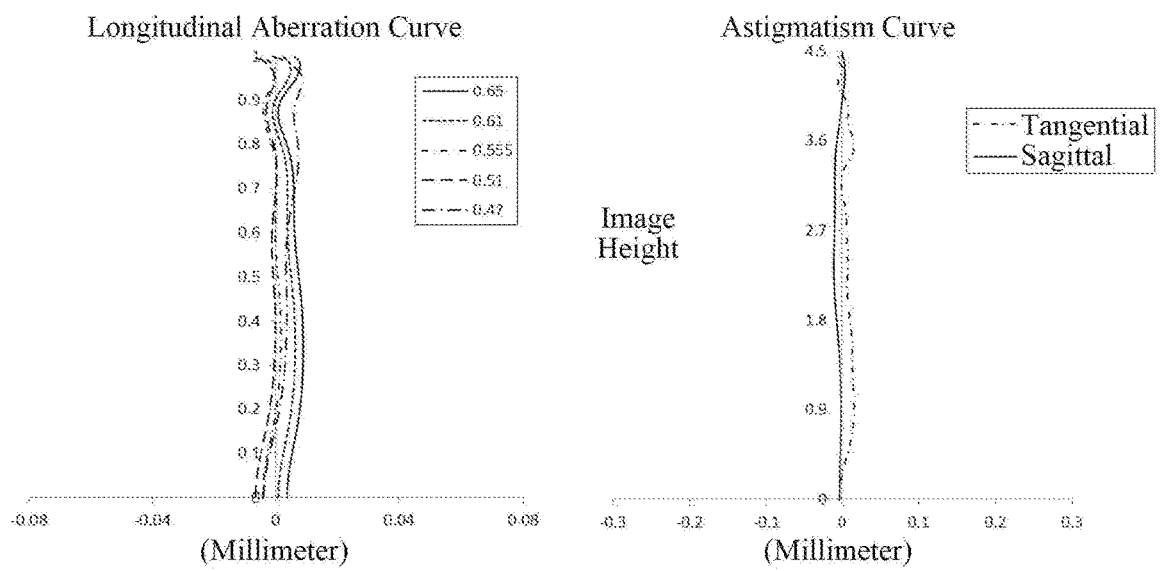
FIG. 10A-10D illustrates a longitudinal aberration curve, an astigmatism curve, a distortion curve and a lateral color curve of the optical imaging system according to embodiment 5, respectively.
Figure 10C:
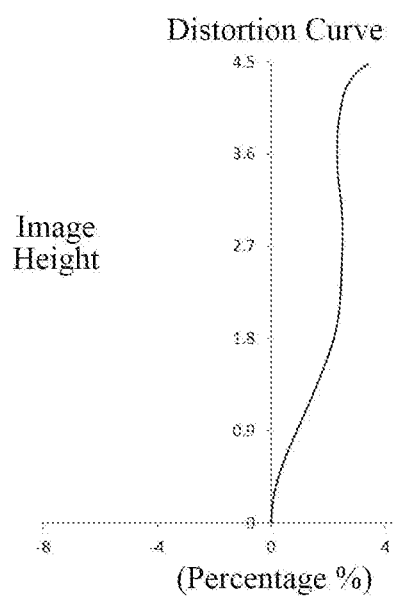
Figure 10D:
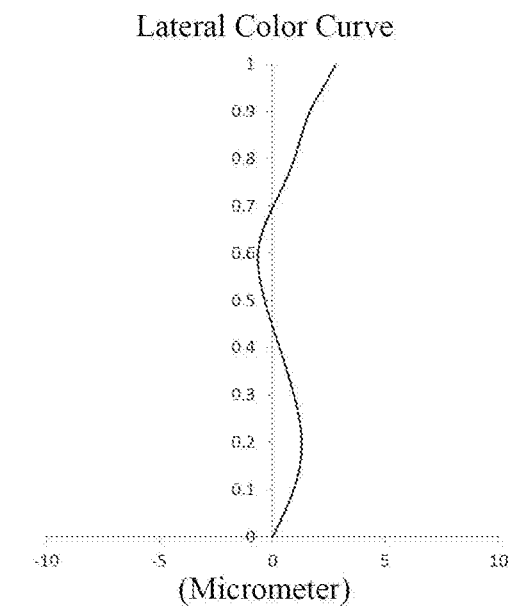

FIG. 10A illustrates a longitudinal aberration curve of the optical imaging system according to embodiment 5, representing deviations of focal points converged by light of different wavelengths after passing through the optical imaging system. FIG. 10B illustrates an astigmatism curve of the optical imaging system according to embodiment 5, representing a curvature of a tangential plane and a curvature of a sagittal plane. FIG. 10C illustrates a distortion curve of the optical imaging system according to embodiment 5, representing amounts of distortion corresponding to different image heights. FIG. 10D illustrates a lateral color curve of the optical imaging system according to embodiment 5, representing deviations of different image heights on an image plane after light passes through the optical imaging system. It can be seen from FIG. 10A to FIG. 10D that the optical imaging system provided in embodiment 5 may achieve a good image quality.

Embodiment 6

Figure 11:
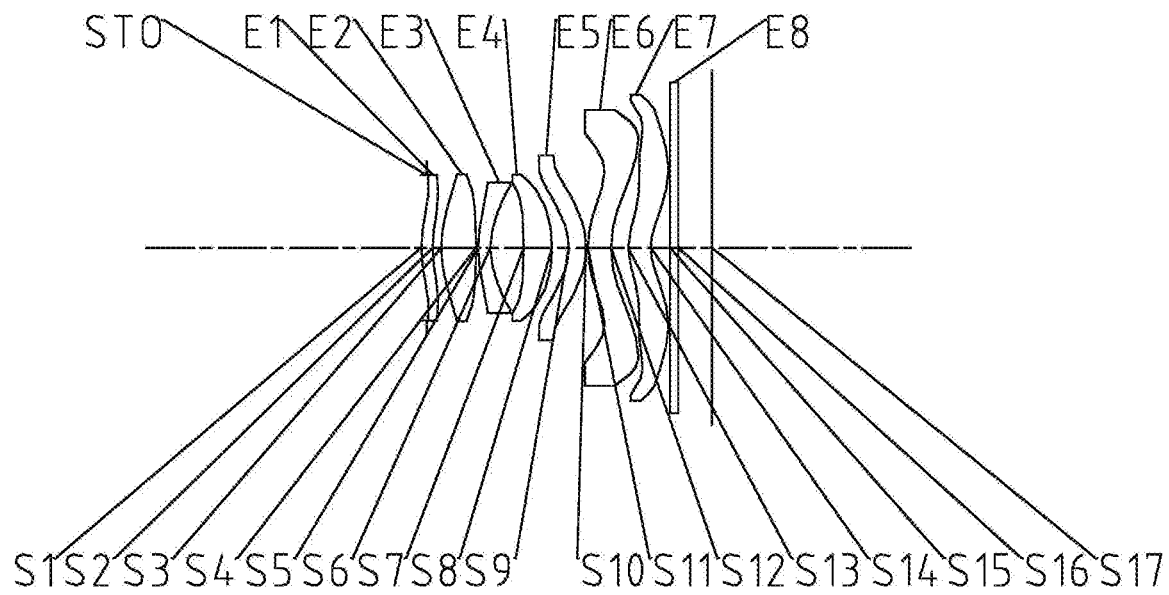
FIG. 11 is a schematic structural view of an optical imaging system according to embodiment 6 of the present disclosure.
Figure 12A:
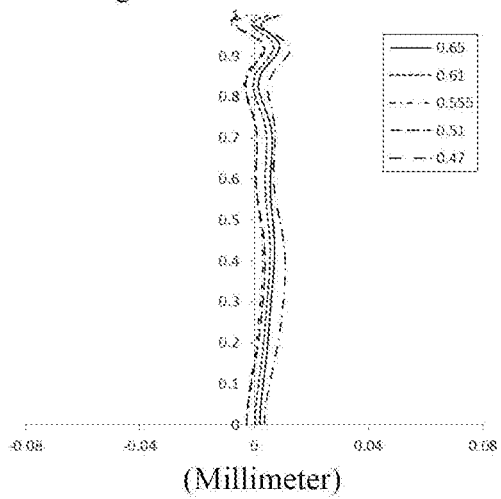
FIG. 12A-12D illustrates a longitudinal aberration curve, an astigmatism curve, a distortion curve and a lateral color curve of the optical imaging system according to embodiment 6, respectively.
Figure 12B:
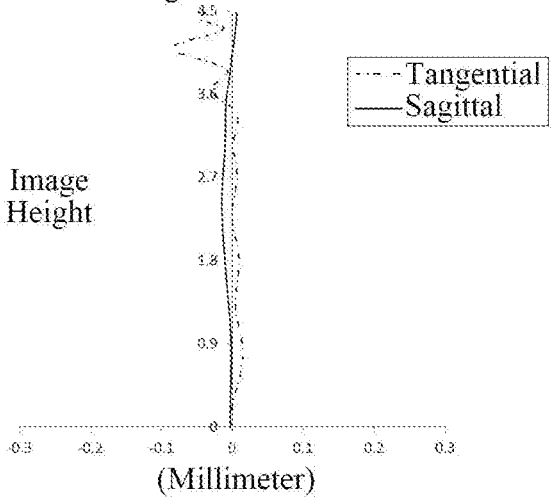
Figure 12C:
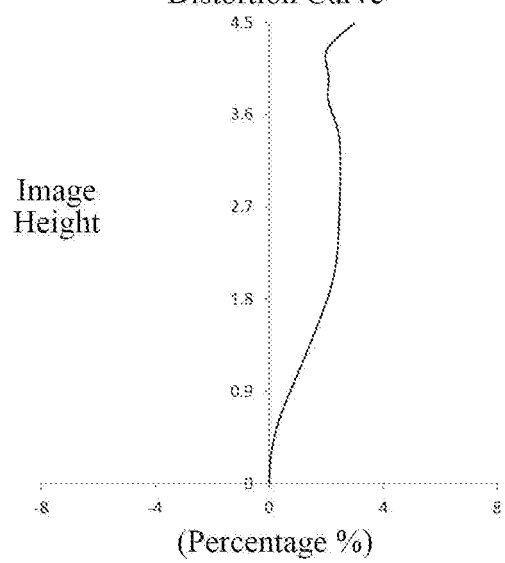
Figure 12D:
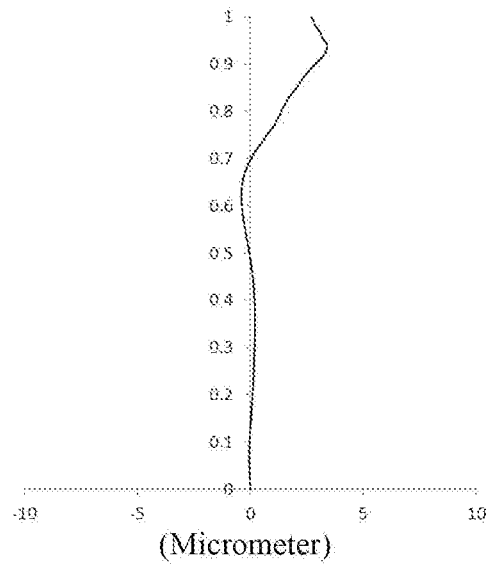

An optical imaging system according to embodiment 6 of the present disclosure is described below with reference to FIG. 11 to FIG. 12D. FIG. 11 is a schematic structural view of the optical imaging system according to embodiment 6 of the present disclosure.

TABLE 9

| Surface number | Surface type | Radius of curvature | Thickness/ distance | Material Refractive index | Material Abbe number | Focal length | Conic coefficient |
| --- | --- | --- | --- | --- | --- | --- | --- |
| OBJ | spherical | infinite | infinite | | | | |
| STO | spherical | infinite | −0.1618 | | | | |
| S1 | aspheric | 3.1830 | 0.2800 | 1.57 | 37.32 | 1084.67 | −1.2708 |
| S2 | aspheric | 3.0972 | 0.2457 | | a | | −0.7267 |
| S3 | aspheric | 3.0680 | 0.8981 | 1.55 | 56.11 | 4.74 | 0.3399 |
| S4 | aspheric | −14.8718 | 0.0500 | | | | 37.7101 |
| S5 | aspheric | 2.9097 | 0.2836 | 1.68 | 19.25 | −9.59 | 0.0663 |
| S6 | aspheric | 1.9308 | 0.7926 | | | | −0.0080 |
| S7 | aspheric | −18.2147 | 0.9064 | 1.55 | 56.11 | 7.72 | 65.6880 |
| S8 | aspheric | −3.4836 | 0.2827 | | | | −0.6477 |
| S9 | aspheric | −2.1267 | 0.5559 | 1.68 | 19.25 | −35.50 | −0.8251 |
| S10 | aspheric | −2.5793 | 0.0500 | | | | −0.6550 |
| S11 | aspheric | 2.6762 | 0.5175 | 1.55 | 56.11 | −999.77 | −1.2438 |
| S12 | aspheric | 2.4813 | 0.4896 | | | | −1.6310 |
| S13 | aspheric | 1.5596 | 0.4483 | 1.54 | 55.74 | −23.08 | −1.0603 |
| S14 | aspheric | 1.2461 | 0.4696 | | | | −1.0500 |
| S15 | spherical | infinite | 0.2100 | 1.52 | 64.17 | | |
| S16 | spherical | infinite | 0.8400 | | | | |
| S17 | spherical | infinite | | | | | |

TABLE 10

| Surface number | A4 | A6 | A8 | A10 | A12 | A14 | A16 | A18 | A20 |
| --- | --- | --- | --- | --- | --- | --- | --- | --- | --- |
| S1 | −2.1047E−02 | −8.5946E−03 | 3.2187E−03 | 1.9318E−03 | −4.2306E−03 | 2.8410E−03 | −9.4364E−04 | 1.5932E−04 | −1.0964E−05 |
| S2 | −3.7255E−02 | −1.3535E−02 | 5.6338E−03 | 2.0933E−03 | −4.0727E−03 | 2.6791E−03 | −9.1666E−04 | 1.6135E−04 | −1.1538E−05 |
| S3 | −9.2023E−03 | −8.5190E−03 | 1.0485E−03 | 2.0331E−03 | −1.9968E−03 | 1.1940E−03 | −4.2247E−04 | 7.6999E−05 | −5.6047E−06 |
| S4 | 7.3925E−03 | −1.8435E−03 | −1.0433E−02 | 1.0004E−02 | −5.1149E−03 | 1.7314E−03 | −3.9480E−04 | 5.4527E−05 | −3.3958E−06 |
| S5 | −5.9344E−02 | 3.0264E−02 | −3.0804E−02 | 2.3219E−02 | −1.1751E−02 | 4.0339E−03 | −9.1364E−04 | 1.2423E−04 | −7.6281E−06 |
| S6 | −7.4411E−02 | 3.0312E−02 | −1.3311E−02 | −4.1671E−03 | 1.0986E−02 | −7.7937E−03 | 2.8525E−03 | −5.4515E−04 | 4.2920E−05 |
| S7 | −1.6568E−02 | −1.5500E−04 | −3.6811E−03 | 4.9224E−03 | −4.1580E−03 | 2.0311E−03 | −5.5586E−04 | 7.2803E−05 | −2.7858E−06 |
| S8 | −3.5238E−02 | −3.8021E−03 | 2.5744E−02 | −2.9382E−02 | 1.9074E−02 | −7.7172E−03 | 1.9172E−03 | −2.6847E−04 | 1.6233E−05 |
| S9 | −1.2961E−02 | 3.2436E−02 | −1.7281E−02 | 5.3262E−03 | −5.1858E−04 | −1.3427E−04 | 4.2826E−05 | −4.4043E−06 | 1.5987E−07 |
| S10 | −1.3818E−02 | 2.9937E−02 | −2.3579E−02 | 1.2554E−02 | −4.5209E−03 | 1.0928E−03 | −1.6513E−04 | 1.3845E−05 | −4.8812E−07 |
| S11 | −7.2095E−03 | −4.0208E−03 | −4.3407E−04 | −2.6669E−04 | 1.7505E−04 | −2.8743E−05 | 1.6524E−06 | 1.0616E−08 | −2.9895E−09 |
| S12 | −1.2876E−02 | 1.4338E−02 | −1.1018E−02 | 3.7736E−03 | −7.3288E−04 | 8.6868E−05 | −6.2531E−06 | 2.5108E−07 | −4.3013E−09 |
| S13 | −1.7116E−01 | 5.0346E−02 | −9.6362E−03 | 1.4927E−03 | −2.0155E−04 | 2.1177E−05 | −1.4861E−06 | 5.9529E−08 | −1.0138E−09 |
| S14 | −1.8328E−01 | 6.4062E−02 | −1.7011E−02 | 3.2035E−03 | −4.1050E−04 | 3.4601E−05 | −1.8225E−06 | 5.4063E−08 | −6.8622E−10 |

As shown in FIG. 11, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a positive refractive power. An object-side surface S13 of the seventh lens E7 is a convex surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane S17.

In embodiment 6, the effective focal length f of the optical imaging system is 5.24 mm, a distance TTL on the optical axis from the object-side surface S1 of the first lens E1 to the image plane S17 is 7.31 mm, half of the diagonal length ImgH of an effective pixel area on the image plane S17 is 4.48 mm, and half of a maximal field-of-view SemiFOV is 39.72°.

Table 11 shows the basic parameters of the optical imaging system of embodiment 6, wherein the units for the radius of curvature, the thickness/distance and the focal length are millimeter (mm). Table 12 shows high-order coefficients applicable to each aspheric surface in embodiment 6, wherein the surface shape of each aspheric lens may be defined by formula (1) shown in the above embodiment 1.

TABLE 11

| Surface number | Surface type | Radius of curvature | Thickness/ distance | Refractive index | Abbe number | Focal length | Conic coefficient |
|---|---|---|---|---|---|---|---|
| OBJ | spherical | infinite | infinite | | | | |
| STO | spherical | infinite | −0.1384 | | | | |
| S1 | aspheric | 3.2848 | 0.2817 | 1.57 | 37.32 | −239.40 | −1.3105 |
| S2 | aspheric | 3.1077 | 0.2187 | | | | −0.7900 |
| S3 | aspheric | 3.0976 | 0.8796 | 1.55 | 56.11 | 4.84 | 0.2612 |
| S4 | aspheric | −16.2613 | 0.0509 | | | | 47.7738 |
| S5 | aspheric | 2.9433 | 0.3076 | 1.68 | 19.25 | −10.17 | 0.1093 |
| S6 | aspheric | 1.9752 | 0.8368 | | | | 0.0070 |
| S7 | aspheric | −18.8109 | 0.7157 | 1.55 | 56.11 | 8.86 | 98.4454 |
| S8 | aspheric | −3.8991 | 0.4186 | | | | −0.0258 |
| S9 | aspheric | −1.7505 | 0.4348 | 1.68 | 19.25 | −12.98 | −0.9018 |
| S10 | aspheric | −2.4045 | 0.0500 | | | | −0.5506 |
| S11 | aspheric | 2.4516 | 0.5839 | 1.55 | 56.11 | 28.84 | −1.1675 |
| S12 | aspheric | 2.6596 | 0.4297 | | | | −1.5396 |
| S13 | aspheric | 1.5429 | 0.5662 | 1.54 | 55.74 | 499.55 | −1.0949 |
| S14 | aspheric | 1.3529 | 0.4859 | | | | −1.0381 |
| S15 | spherical | infinite | 0.2100 | 1.52 | 64.17 | | |
| S16 | spherical | infinite | 0.8401 | | | | |
| S17 | spherical | infinite | | | | | |

TABLE 12

| Surface number | A4 | A6 | A8 | A10 | A12 | A14 | A16 | A18 | A20 |
|---|---|---|---|---|---|---|---|---|---|
| S1 | −2.0580E−02 | −1.1523E−02 | 5.5350E−03 | 1.5425E−03 | −4.9130E−03 | 3.4311E−03 | −1.1596E−03 | 1.9826E−04 | −1.3781E−05 |
| S2 | −3.4565E−02 | −2.4297E−02 | 1.7492E−02 | −6.4382E−03 | 3.1820E−04 | 1.1392E−03 | −5.7645E−04 | 1.1934E−04 | −9.3510E−06 |
| S3 | −6.8168E−03 | −1.4344E−02 | 5.0663E−03 | 5.3746E−04 | −1.6784E−03 | 1.1890E−03 | −4.4904E−04 | 8.5373E−05 | −6.4351E−06 |
| S4 | −6.0930E−03 | 1.9669E−02 | −3.3349E−02 | 2.7365E−02 | −1.4307E−02 | 4.9583E−03 | −1.1041E−03 | 1.4281E−04 | −8.1519E−06 |
| S5 | −6.6545E−03 | 3.8148E−02 | −2.9907E−02 | 1.5627E−02 | −4.0923E−03 | −2.0777E−04 | 4.7268E−04 | −1.2268E−04 | 1.0756E−05 |
| S6 | −7.1687E−02 | 2.7360E−02 | −9.4334E−03 | −4.0817E−03 | 7.5710E−03 | −4.8498E−03 | 1.6731E−03 | −3.0574E−04 | 2.3059E−05 |
| S7 | −2.1241E−02 | 8.9087E−03 | −1.9629E−02 | 2.2011E−02 | −1.5369E−02 | 6.4365E−03 | −1.5078E−03 | 1.5802E−04 | −2.6600E−06 |
| S8 | −3.5283E−02 | 6.4414E−03 | 5.1960E−03 | −1.3132E−02 | 1.2165E−02 | −6.2531E−03 | 1.8666E−03 | −3.0525E−04 | 2.1153E−05 |
| S9 | 1.5049E−03 | 2.2814E−02 | −1.9146E−02 | 1.0893E−02 | −3.8744E−03 | 9.2673E−04 | −1.4683E−04 | 1.3691E−05 | −5.5971E−07 |
| S10 | −3.3983E−02 | 4.1570E−02 | −2.7290E−02 | 1.2625E−02 | −3.9516E−03 | 8.2241E−04 | −1.0568E−04 | 7.4081E−06 | −2.1406E−07 |
| S11 | −3.3705E−02 | 1.9015E−02 | −1.2206E−02 | 4.5166E−03 | −1.1573E−03 | 2.0250E−04 | −2.2343E−05 | 1.3795E−06 | −3.6090E−08 |
| S12 | −2.2924E−02 | 1.9923E−02 | −1.1107E−02 | 3.2668E−03 | −5.8455E−04 | 6.6794E−05 | −4.7762E−06 | 1.9342E−07 | −3.3548E−09 |
| S13 | −1.5393E−01 | 4.5700E−02 | −1.0267E−02 | 1.9201E−03 | −2.7047E−04 | 2.6000E−05 | −1.5843E−06 | 5.4761E−08 | −8.1277E−10 |
| S14 | −1.4703E−01 | 4.5330E−02 | −1.1103E−02 | 1.9763E−03 | −2.4618E−04 | 2.0755E−05 | −1.1142E−06 | 3.3932E−08 | −4.4212E−10 | surface, and an image-side surface S12 of the sixth lens E6 is a concave surface. The seventh lens E7 has a positive FIG. 12A illustrates a longitudinal aberration curve of the optical imaging system according to embodiment 6, representing deviations of focal points converged by light of different wavelengths after passing through the optical imaging system. FIG. 12B illustrates an astigmatism curve of the optical imaging system according to embodiment 6, representing a curvature of a tangential plane and a curvature of a sagittal plane. FIG. 12C illustrates a distortion curve of the optical imaging system according to embodiment 6, representing amounts of distortion corresponding to different image heights. FIG. 12D illustrates a lateral color curve of the optical imaging system according to embodiment 6, representing deviations of different image heights on an image plane after light passes through the optical imaging system. It can be seen from FIG. 12A to FIG. 12D that the optical imaging system provided in embodiment 6 may achieve a good image quality.

Embodiment 7

An optical imaging system according to embodiment 7 of the present disclosure is described below with reference to FIG. 13 to FIG. 14D. FIG. 13 is a schematic structural view of the optical imaging system according to embodiment 7 of the present disclosure.

As shown in FIG. 13, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface 516. The optical imaging system has an image plane 517. Light from the object sequentially passes through the respective surfaces S1 to S16 and is finally imaged on the image plane 517.

In embodiment 7, the effective focal length f of the optical imaging system is 5.24 mm, a distance TTL on the optical axis from the object-side surface S1 of the first lens E1 to the image plane S17 is 7.30 mm, half of the diagonal length ImgH of an effective pixel area on the image plane S17 is 4.48 mm, and half of a maximal field-of-view SemiFOV is 39.60°.

Table 13 shows the basic parameters of the optical imaging system of embodiment 7, wherein the units for the radius of curvature, the thickness/distance and the focal length are millimeter (mm). Table 14 shows high-order coefficients applicable to each aspheric surface in embodiment 7, wherein the surface shape of each aspheric lens may be defined by formula (1) shown in the above embodiment 1.

TABLE 13

| Surface number | Surface type | Radius of curvature | Thickness/ distance | Material Refractive index | Abbe number | Focal length | Conic coefficient |
|---|---|---|---|---|---|---|---|
| OBJ | spherical | infinite | infinite | | | | |
| STO | spherical | infinite | −0.2369 | | | | |
| S1 | aspheric | 3.0716 | 0.3048 | 1.57 | 37.32 | −175.82 | −0.8550 |
| S2 | aspheric | 2.8729 | 0.2416 | | | | −0.6991 |
| S3 | aspheric | 2.8314 | 0.7994 | 1.55 | 56.11 | 5.20 | −0.0084 |
| S4 | aspheric | 1000.0000 | 0.0500 | | | | −99.0000 |
| S5 | aspheric | 2.6034 | 0.2485 | 1.68 | 19.25 | −13.09 | −0.0643 |
| S6 | aspheric | 1.9352 | 0.6784 | | | | −0.0055 |
| S7 | aspheric | −121.7780 | 1.0473 | 1.55 | 56.11 | 7.94 | −99.0000 |
| S8 | aspheric | −4.1970 | 0.1471 | | | | −1.3832 |
| S9 | aspheric | −2.0702 | 0.5304 | 1.68 | 19.25 | −10.99 | −0.9150 |
| S10 | aspheric | −3.1639 | 0.0500 | | | | −0.3794 |
| S11 | aspheric | 2.0260 | 0.4971 | 1.55 | 56.11 | 11.40 | −1.6222 |
| S12 | aspheric | 2.7430 | 0.7818 | | | | −1.2603 |
| S13 | aspheric | 1.9674 | 0.4728 | 1.54 | 55.74 | −12.88 | −1.0099 |
| S14 | aspheric | 1.4030 | 0.4038 | | | | −0.9480 |
| S15 | spherical | infinite | 0.2100 | 1.52 | 64.17 | | |
| S16 | spherical | infinite | 0.8397 | | | | |
| S17 | spherical | infinite | | | | | |

TABLE 14

| Surface number | A4 | A6 | A8 | A10 | A12 | A14 | A16 | A18 | A20 |
|---|---|---|---|---|---|---|---|---|---|
| S1 | −2.0444E−02 | −1.3646E−03 | −7.8171E−03 | 1.3865E−02 | −1.2026E−02 | 5.8821E−03 | −1.6473E−03 | 2.4847E−04 | −1.5701E−05 |
| S2 | −3.6969E−02 | −9.8200E−03 | −3.0701E−03 | 1.3274E−02 | −1.2650E−02 | 6.6500E−03 | −2.0068E−03 | 3.2441E−04 | −2.1751E−05 |

TABLE 14-continued

| Surface number | A4 | A6 | A8 | A10 | A12 | A14 | A16 | A18 | A20 |
|---|---|---|---|---|---|---|---|---|---|
| S3 | −8.0942E−03 | −1.0621E−02 | −1.9794E−03 | 6.7249E−03 | −6.4733E−03 | 3.7973E−03 | −1.2716E−03 | 2.2013E−04 | −1.5363E−05 |
| S4 | −1.3054E−02 | 2.2679E−02 | −3.8854E−02 | 3.0954E−02 | −1.5159E−02 | 4.9303E−03 | −1.0647E−03 | 1.3884E−04 | −8.2129E−06 |
| S5 | −7.7057E−02 | 3.5752E−02 | −2.3332E−02 | 6.6533E−03 | 5.2028E−03 | −5.7182E−03 | 2.2580E−03 | −4.2384E−04 | 3.1759E−05 |
| S6 | −7.5084E−02 | 2.3249E−02 | −6.9920E−03 | −2.2252E−03 | 4.6751E−03 | −2.9549E−03 | 8.9974E−04 | −1.2913E−04 | 6.3347E−06 |
| S7 | −1.2592E−02 | 1.1948E−02 | −2.8849E−02 | 3.6705E−02 | −2.9609E−02 | 1.5002E−02 | −4.6617E−03 | 8.1085E−04 | −6.0565E−05 |
| S8 | −3.3754E−02 | 2.0840E−02 | −1.2360E−02 | −1.9145E−03 | 6.7905E−03 | −3.9563E−03 | 1.1191E−03 | −1.6175E−04 | 9.5822E−06 |
| S9 | 2.4676E−02 | 5.8128E−03 | −1.7988E−02 | 1.4953E−02 | −6.3538E−03 | 1.6511E−03 | −2.6755E−04 | 2.4865E−05 | −1.0105E−06 |
| S10 | −1.5634E−02 | 1.0314E−02 | −3.4495E−03 | 1.7552E−03 | −7.6955E−04 | 2.2781E−04 | −4.0147E−05 | 3.8900E−06 | −1.6435E−07 |
| S11 | −1.9190E−02 | 1.4535E−03 | −1.8357E−03 | 1.4761E−04 | 1.4149E−04 | −5.5676E−05 | 8.7627E−06 | −6.2601E−07 | 1.6605E−08 |
| S12 | 2.9957E−02 | −2.1893E−02 | 5.0649E−03 | −5.9048E−04 | 2.7925E−06 | 1.1044E−05 | −1.7281E−06 | 1.1366E−07 | −2.8128E−09 |
| S13 | −1.4531E−01 | 4.0281E−02 | −9.3270E−03 | 2.0106E−03 | −3.2584E−04 | 3.5032E−05 | −2.3704E−06 | 9.1981E−08 | −1.5591E−09 |
| S14 | −1.6515E−01 | 5.6715E−02 | −1.6748E−02 | 3.7133E−03 | −5.8058E−04 | 6.0481E−05 | −3.9265E−06 | 1.4232E−07 | −2.1879E−09 |

Figures 14C, 14D:
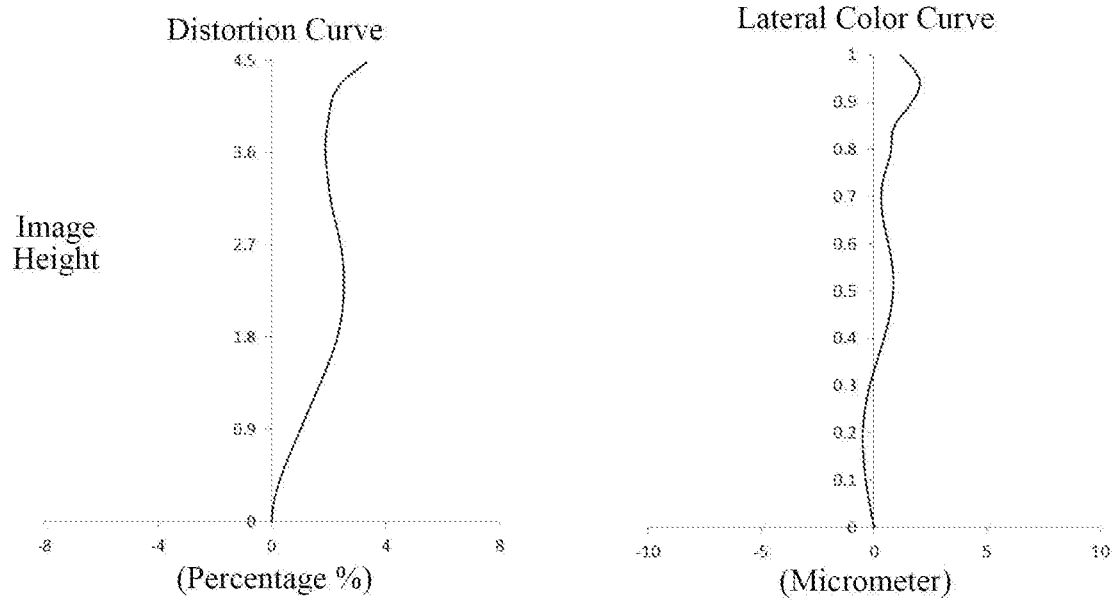

FIG. 14A illustrates a longitudinal aberration curve of the optical imaging system according to embodiment 7, representing deviations of focal points converged by light of different wavelengths after passing through the optical imaging system. FIG. 14B illustrates an astigmatism curve of the optical imaging system according to embodiment 7, representing a curvature of a tangential plane and a curvature of a sagittal plane. FIG. 14C illustrates a distortion curve of the optical imaging system according to embodiment 7, representing amounts of distortion corresponding to different image heights. FIG. 14D illustrates a lateral color curve of the optical imaging system according to embodiment 7, representing deviations of different image heights on an image plane after light passes through the optical imaging system. It can be seen from FIG. 14A to FIG. 14D that the optical imaging system provided in embodiment 7 may achieve a good image quality.

Embodiment 8

Figure 15:
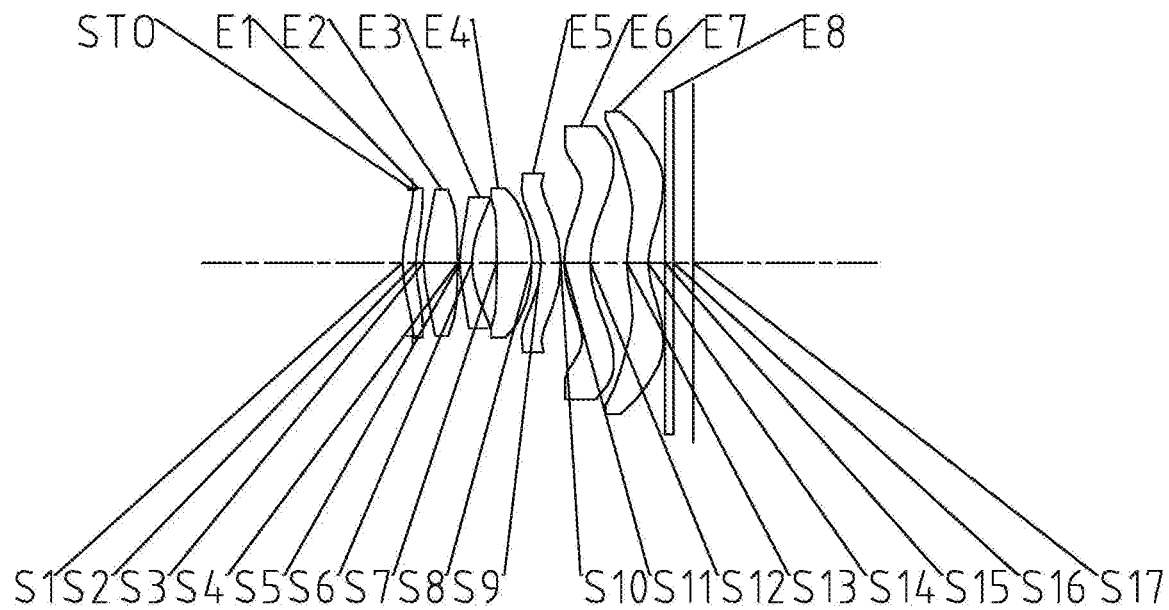
FIG. 15 is a schematic structural view of an optical imaging system according to embodiment 8 of the present disclosure.

An optical imaging system according to embodiment 8 of the present disclosure is described below with reference to FIG. 15 to FIG. 16D. FIG. 15 is a schematic structural view of the optical imaging system according to embodiment 8 of the present disclosure.

As shown in FIG. 15, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane 517.

In embodiment 8, the effective focal length f of the optical imaging system is 5.13 mm, a distance TTL on the optical axis from the object-side surface S1 of the first lens E1 to the image plane S17 is 7.30 mm, half of the diagonal length ImgH of an effective pixel area on the image plane S17 is 4.48 mm, and half of a maximal field-of-view SemiFOV is 40.30°.

Table 15 shows the basic parameters of the optical imaging system of embodiment 8, wherein the units for the radius of curvature, the thickness/distance and the focal length are millimeter (mm). Table 16 shows high-order coefficients applicable to each aspheric surface in embodiment 8, wherein the surface shape of each aspheric lens may be defined by formula (1) shown in the above embodiment 1.

TABLE 15

| Surface number | Surface type | Radius of curvature | Thickness/ distance | Material | | Focal length | Conic coefficient |
|---|---|---|---|---|---|---|---|
| | | | | Refractive index | Abbe number | | |
| OBJ | spherical | infinite | infinite | | | | |
| STO | spherical | infinite | −0.2479 | | | | |
| S1 | aspheric | 3.2239 | 0.3342 | 1.57 | 37.32 | −121.93 | −0.6985 |
| S2 | aspheric | 2.9650 | 0.1922 | | | | −0.6304 |
| S3 | aspheric | 3.1571 | 0.8585 | 1.55 | 56.11 | 5.10 | −0.0046 |
| S4 | aspheric | −21.1793 | 0.0500 | | | | 76.3747 |
| S5 | aspheric | 2.9538 | 0.3025 | 1.68 | 19.25 | −11.61 | 0.0032 |
| S6 | aspheric | 2.0586 | 0.6241 | | | | 0.0001 |

TABLE 15-continued

| Surface number | Surface type | Radius of curvature | Thickness/ distance | Material Refractive index | Abbe number | Focal length | Conic coefficient |
|---|---|---|---|---|---|---|---|
| S7 | aspheric | −1403.4309 | 0.8827 | 1.55 | 56.11 | 8.57 | −99.0000 |
| S8 | aspheric | −4.6648 | 0.2348 | | | | −0.9198 |
| S9 | aspheric | −2.0969 | 0.4908 | 1.68 | 19.25 | −11.79 | −0.9953 |
| S10 | aspheric | −3.1123 | 0.0868 | | | | −0.7299 |
| S11 | aspheric | 2.0451 | 0.6522 | 1.55 | 56.11 | 10.85 | −1.4593 |
| S12 | aspheric | 2.7722 | 0.9198 | | | | −1.4838 |
| S13 | aspheric | 2.3070 | 0.5303 | 1.54 | 55.74 | −12.56 | −1.0995 |
| S14 | aspheric | 1.5810 | 0.4321 | | | | −1.0071 |
| S15 | spherical | infinite | 0.2100 | 1.52 | 64.17 | | |
| S16 | spherical | infinite | 0.4989 | | | | |
| S17 | spherical | infinite | | | | | |

TABLE 16

| Surface number | A4 | A6 | A8 | A10 | A12 | A14 | A16 | A18 | A20 |
|---|---|---|---|---|---|---|---|---|---|
| S1 | −2.0854E−02 | −8.0831E−04 | −1.8132E−03 | 3.5659E−03 | −3.3938E−03 | 1.6956E−03 | −4.6598E−04 | 6.8603E−05 | −4.2617E−06 |
| S2 | −4.5213E−02 | −1.6654E−03 | −8.4747E−03 | 1.4444E−02 | −1.0938E−02 | 5.0068E−03 | −1.3733E−03 | 2.0630E−04 | −1.2932E−05 |
| S3 | −1.9475E−02 | −9.8157E−03 | 5.4764E−04 | 1.7902E−03 | −8.2825E−04 | 4.4280E−04 | −1.9156E−04 | 3.8828E−05 | −2.7304E−06 |
| S4 | −6.6542E−03 | 1.0419E−02 | −2.4851E−02 | 2.1600E−02 | −1.0377E−02 | 2.8630E−03 | −4.1673E−04 | 2.1504E−05 | 7.5462E−07 |
| S5 | −5.7219E−02 | 2.9099E−02 | −3.1499E−02 | 2.5872E−02 | −1.4104E−02 | 4.9552E−03 | −1.1074E−03 | 1.4932E−04 | −9.4859E−06 |
| S6 | −6.3383E−02 | 2.4119E−02 | −1.6676E−02 | 8.5313E−03 | −2.6121E−03 | 3.2208E−05 | 2.4377E−04 | −6.8724E−05 | 6.0634E−06 |
| S7 | −1.5641E−02 | 8.9206E−03 | −1.5147E−02 | 1.3898E−02 | −7.5457E−03 | 2.0576E−03 | −1.3320E−04 | −6.1210E−05 | 1.0528E−05 |
| S8 | −3.5153E−02 | −1.2177E−03 | 1.4659E−02 | −1.5921E−02 | 1.1818E−02 | −5.8374E−03 | 1.7243E−03 | −2.7423E−04 | 1.8034E−05 |
| S9 | 3.4563E−02 | −4.0932E−02 | 3.8945E−02 | −1.6231E−02 | 2.5313E−03 | 4.7075E−04 | −2.6517E−04 | 4.1745E−05 | −2.3479E−06 |
| S10 | −7.2687E−03 | −8.5894E−03 | 1.8032E−02 | −1.1441E−02 | 4.2435E−03 | −1.0045E−03 | 1.5485E−04 | −1.4286E−05 | 5.8681E−07 |
| S11 | −4.2774E−02 | 1.5011E−02 | −6.1897E−03 | 1.2963E−03 | −9.0532E−05 | −2.0454E−05 | 5.2791E−06 | −4.4627E−07 | 1.3296E−08 |
| S12 | 7.7804E−02 | −8.9827E−03 | 1.7557E−03 | −1.4641E−04 | −8.2030E−06 | 3.6874E−06 | −4.3428E−07 | 2.4087E−08 | −5.2483E−10 |
| S13 | −1.1016E−01 | 2.8309E−02 | −6.2644E−03 | 1.2234E−03 | −1.8003E−04 | 1.8213E−05 | −1.1954E−06 | 4.5732E−08 | −7.6776E−10 |
| S14 | −1.2453E−01 | 4.0103E−02 | −1.1142E−02 | 2.3196E−03 | −3.4118E−04 | 3.3336E−05 | −2.0168E−06 | 6.7662E−08 | −9.5736E−10 |

Figure 16A:
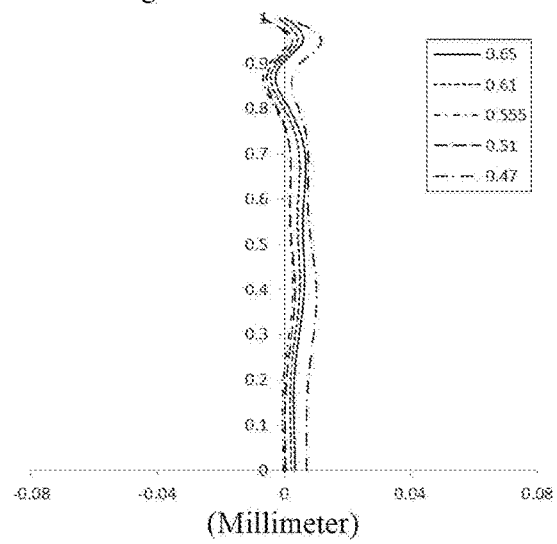
FIG. 16A-16D illustrates a longitudinal aberration curve, an astigmatism curve, a distortion curve and a lateral color curve of the optical imaging system according to embodiment 8, respectively.
Figure 16B:
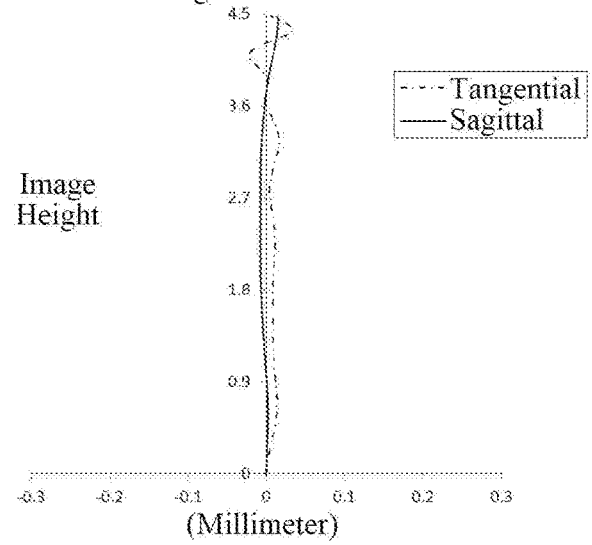
Figure 16C:
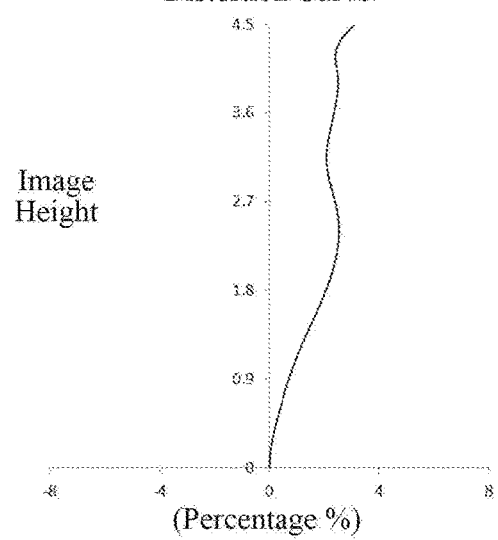
Figure 16D:
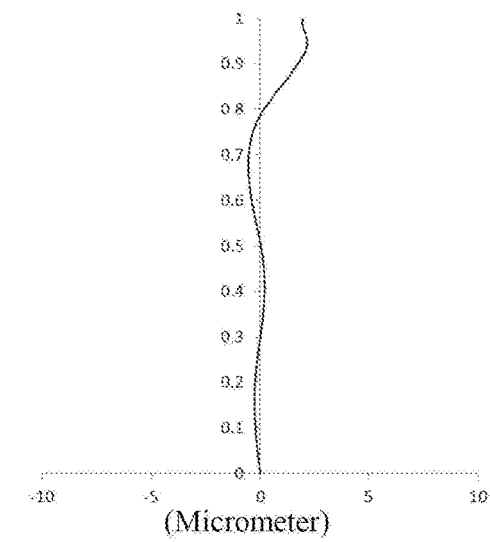

FIG. 16A illustrates a longitudinal aberration curve of the optical imaging system according to embodiment 8, representing deviations of focal points converged by light of different wavelengths after passing through the optical imaging system. FIG. 16B illustrates an astigmatism curve of the optical imaging system according to embodiment 8, representing a curvature of a tangential plane and a curvature of a sagittal plane. FIG. 16C illustrates a distortion curve of the optical imaging system according to embodiment 8, representing amounts of distortion corresponding to different image heights. FIG. 16D illustrates a lateral color curve of the optical imaging system according to embodiment 8, representing deviations of different image heights on an image plane after light passes through the optical imaging system. It can be seen from FIG. 16A to FIG. 16D that the optical imaging system provided in embodiment 8 may achieve a good image quality.

Embodiment 9

Figure 17:
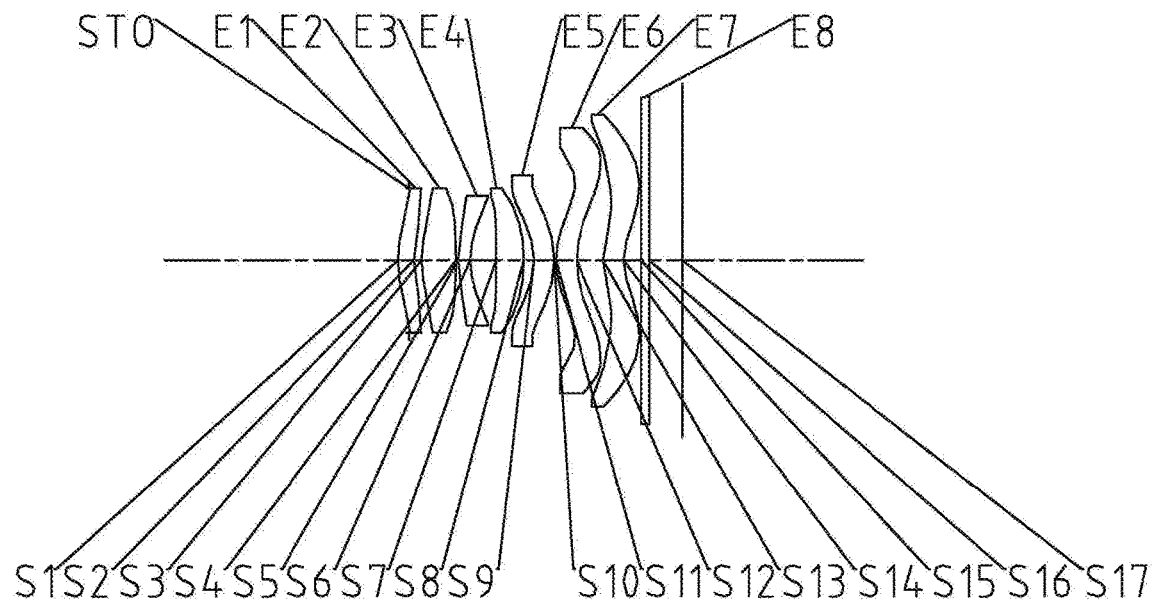
FIG. 17 is a schematic structural view of an optical imaging system according to embodiment 9 of the present disclosure.

An optical imaging system according to embodiment 9 of the present disclosure is described below with reference to FIG. 17 to FIG. 18D. FIG. 17 is a schematic structural view of the optical imaging system according to embodiment 9 of the present disclosure.

As shown in FIG. 17, the optical imaging system includes, sequentially from an object side to an image side along an optical axis, a diaphragm STO, a first lens E1, a second lens E2, a third lens E3, a fourth lens E4, a fifth lens E5, a sixth lens E6, a seventh lens E7 and a optical filter E8.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. The optical imaging system has an image plane S17. Light from the object sequentially passes through the respective surfaces S1 to S16 and is finally imaged on the image plane 517.

In embodiment 9, the effective focal length f of the optical imaging system is 5.17 mm, a distance TTL on the optical axis from the object-side surface S1 of the first lens E1 to the image plane S17 is 7.25 mm, half of the diagonal length ImgH of an effective pixel area on the image plane S17 is 4.48 mm, and half of a maximal field-of-view SemiFOV is 40.09°.

Table 17 shows the basic parameters of the optical imaging system of embodiment 9, wherein the units for the radius of curvature, the thickness/distance and the focal length are millimeter (mm). Table 18 shows high-order coefficients applicable to each aspheric surface in embodiment 9, wherein the surface shape of each aspheric lens may be defined by formula (1) shown in the above embodiment 1.

a sagittal plane. FIG. 18C illustrates a distortion curve of the optical imaging system according to embodiment 9, representing amounts of distortion corresponding to different image heights. FIG. 18D illustrates a lateral color curve of the optical imaging system according to embodiment 9, representing deviations of different image heights on an

TABLE 17

| Surface number | Surface type | Radius of curvature | Thickness/ distance | Material Refractive index | Abbe number | Focal length | Conic coefficient |
|---|---|---|---|---|---|---|---|
| OBJ | spherical | infinite | infinite | | | | |
| STO | spherical | infinite | −0.2807 | | | | |
| S1 | aspheric | 3.0594 | 0.4029 | 1.55 | 56.11 | −262.32 | −0.6513 |
| S2 | aspheric | 2.8561 | 0.2006 | | | | −0.6596 |
| S3 | aspheric | 3.1968 | 0.8723 | 1.55 | 56.11 | 5.12 | −0.0132 |
| S4 | aspheric | −20.2481 | 0.0494 | | | | 81.3379 |
| S5 | aspheric | 2.9675 | 0.3080 | 1.67 | 20.37 | −11.77 | −0.0177 |
| S6 | aspheric | 2.0636 | 0.6605 | | | | −0.0042 |
| S7 | aspheric | 130.3886 | 0.7012 | 1.55 | 56.11 | 8.62 | 99.0000 |
| S8 | aspheric | −4.8726 | 0.2614 | | | | −1.7798 |
| S9 | aspheric | −1.8872 | 0.5132 | 1.68 | 19.25 | −11.35 | −1.0168 |
| S10 | aspheric | −2.7756 | 0.0500 | | | | −0.7181 |
| S11 | aspheric | 2.0866 | 0.5287 | 1.55 | 56.n | 12.52 | −1.4650 |
| S12 | aspheric | 2.7346 | 0.6817 | | | | −1.4086 |
| S13 | aspheric | 1.8493 | 0.5227 | 1.54 | 55.74 | −24.42 | −1.1584 |
| S14 | aspheric | 1.4607 | 0.4443 | | | | −1.0196 |
| S15 | spherical | infinite | 0.2100 | 1.52 | 64.17 | | |
| S16 | spherical | infinite | 0.8400 | | | | |
| S17 | spherical | infinite | | | | | |

TABLE 18

| Surface number | A4 | A6 | A8 | A10 | A12 | A14 | A16 | A18 | A20 |
|---|---|---|---|---|---|---|---|---|---|
| S1 | −1.8247E−02 | −2.5532E−03 | −1.0227E−03 | 3.5952E−03 | −3.7522E−03 | 1.9498E−03 | −5.5656E−04 | 8.5678E−05 | −5.5966E−06 |
| S2 | −4.1506E−02 | −4.9553E−03 | −1.0497E−02 | 1.9252E−02 | −1.5489E−02 | 7.5764E−03 | −2.2183E−03 | 3.5454E−04 | −2.3634E−05 |
| S3 | −1.6877E−02 | −1.0143E−02 | −2.9986E−03 | 5.8920E−03 | −3.9555E−03 | 2.1445E−03 | −7.5689E−04 | 1.3898E−04 | −9.9997E−06 |
| S4 | −4.9856E−03 | 1.2955E−02 | −3.4369E−02 | 3.3478E−02 | −1.8809E−02 | 6.5737E−03 | −1.4178E−03 | 1.7302E−04 | −9.0983E−06 |
| S5 | −5.9240E−02 | 3.7779E−02 | −5.0358E−02 | 4.7599E−02 | −2.9106E−02 | 1.1384E−02 | −2.7960E−03 | 4.0081E−04 | −2.5871E−05 |
| S6 | −6.5853E−02 | 2.6093E−02 | −1.5695E−02 | 2.6878E−03 | 5.1440E−03 | −5.2261E−03 | 2.2226E−03 | −4.6284E−04 | 3.8719E−05 |
| S7 | −1.7867E−02 | 1.6134E−02 | −2.6067E−02 | 2.3463E−02 | −1.1999E−02 | 2.7844E−03 | 1.3112E−04 | −2.0855E−04 | 3.1480E−05 |
| S8 | −4.0067E−02 | 2.2256E−02 | −1.9524E−02 | 1.5176E−02 | −8.6793E−03 | 3.5702E−03 | −9.8564E−04 | 1.5558E−04 | −1.0217E−05 |
| S9 | 1.6273E−02 | 1.9599E−03 | −3.4635E−03 | 5.6924E−03 | −3.8816E−03 | 1.6128E−03 | −4.0259E−04 | 5.4169E−05 | −3.0295E−06 |
| S10 | −2.3915E−02 | 1.9187E−02 | −5.7732E−03 | 6.3874E−04 | 4.9534E−04 | −3.1152E−04 | 8.9504E−05 | −1.2986E−05 | 7.3841E−07 |
| S11 | −3.3687E−02 | 1.5491E−02 | −9.4744E−03 | 3.3100E−03 | −7.5329E−04 | 1.1062E−04 | −9.9092E−06 | 4.9133E−07 | −1.0358E−08 |
| S12 | 1.0190E−02 | −8.0708E−03 | 4.9968E−04 | 3.0672E−04 | −9.7955E−05 | 1.4921E−05 | −1.3298E−06 | 6.5280E−08 | −1.3440E−09 |
| S13 | −1.2654E−01 | 3.5630E−02 | −8.4905E−03 | 1.6842E−03 | −2.3561E−04 | 2.1242E−05 | −1.1781E−06 | 3.7078E−08 | −5.1502E−10 |
| S14 | −1.3694E−01 | 4.3092E−02 | −1.1391E−02 | 2.2244E−03 | −3.0529E−04 | 2.8144E−05 | −1.6374E−06 | 5.3872E−08 | −7.6025E−10 |

Figure 18A:
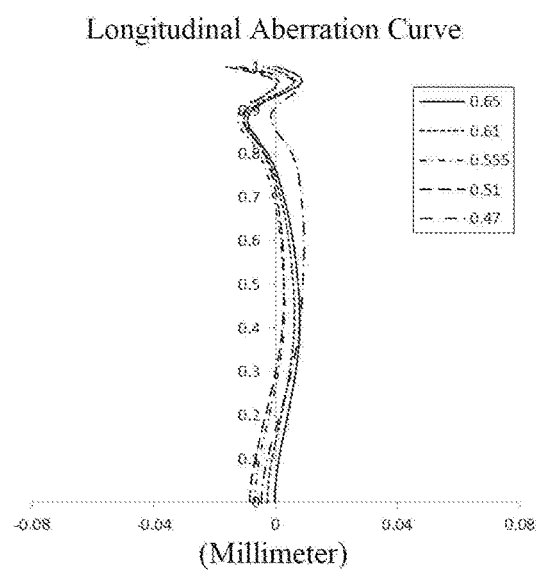
Figure 18B:
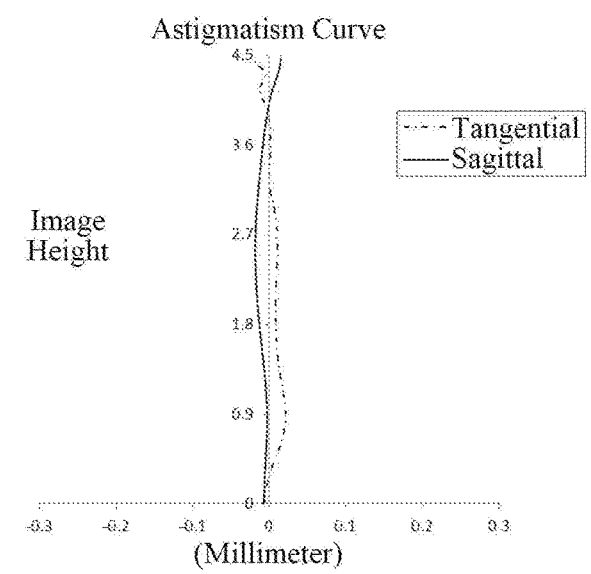

FIG. 18A illustrates a longitudinal aberration curve of the optical imaging system according to embodiment 9, representing deviations of focal points converged by light of different wavelengths after passing through the optical imaging system. FIG. 18B illustrates an astigmatism curve of the optical imaging system according to embodiment 9, representing a curvature of a tangential plane and a curvature of image plane after light passes through the optical imaging system. It can be seen from FIG. 18A to FIG. 18D that the optical imaging system provided in embodiment 9 may achieve a good image quality.

Based on the above, embodiments 1 to 9 respectively satisfy the relationship shown in Table 19.

TABLE 19

| Conditional\Embodiment | 1 | 2 | 3 | 4 | 5 | 6 | 7 | 8 | 9 |
|---|---|---|---|---|---|---|---|---|---|
| f/EPD | 1.43 | 1.41 | 1.40 | 1.46 | 1.43 | 1.42 | 1.42 | 1.39 | 1.40 |
| SAG22/SAG21 | −0.77 | −1.13 | −0.88 | −0.32 | −0.53 | −0.61 | −0.45 | −0.82 | −0.89 |
| TTL/f | 1.38 | 1.41 | 1.42 | 1.39 | 1.39 | 1.40 | 1.39 | 1.42 | 1.40 |
| f/f5 | −0.46 | −0.41 | −0.42 | −0.51 | −0.15 | −0.40 | −0.48 | −0.44 | −0.46 |
| T23/T12 | 0.18 | 0.16 | 0.27 | 0.76 | 0.20 | 0.23 | 0.21 | 0.26 | 0.25 |
| (CT2 + CT3 + CT4)/f | 0.40 | 0.37 | 0.40 | 0.41 | 0.40 | 0.36 | 0.40 | 0.40 | 0.36 |
| Σ CT/TTL | 0.54 | 0.53 | 0.55 | 0.54 | 0.53 | 0.52 | 0.53 | 0.55 | 0.53 |

TABLE 19-continued

| Conditional\Embodiment | 1 | 2 | 3 | 4 | 5 | 6 | 7 | 8 | 9 |
|---|---|---|---|---|---|---|---|---|---|
| f2/(R1 + R2) | 0.60 | 0.84 | 0.86 | 1.06 | 0.76 | 0.76 | 0.87 | 0.82 | 0.87 |
| \|R9/R10\| | 0.74 | 0.70 | 0.68 | 0.63 | 0.82 | 0.73 | 0.65 | 0.67 | 0.68 |
| tan(SemiFOV) × f (mm) | 4.59 | 4.48 | 4.34 | 4.37 | 4.33 | 4.35 | 4.33 | 4.35 | 4.35 |
| ImgH/\|R5 + R6\| | 0.98 | 0.88 | 0.90 | 1.05 | 0.93 | 0.91 | 0.99 | 0.89 | 0.89 |

The present disclosure further provides an imaging device, having a photosensitive element which may be a photosensitive charge-coupled device (CCD) or complementary metal-oxide semiconductor (CMOS) element for imaging. The imaging device may be an independent imaging device such as a digital camera, or may be an imaging module integrated in a mobile electronic device such as a mobile phone. The imaging device is equipped with the optical imaging system described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising a first lens, a second lens, a third lens, a fourth lens, a fifth lens, a sixth lens and a seventh lens, which are sequentially arranged from an object side of the optical imaging system to an image side of the optical imaging system along an optical axis of the optical imaging system,
wherein,
the first lens has a refractive power, and an object-side surface of the first lens is a convex surface;
the second lens has a positive refractive power;
the third lens has a refractive power;
the fourth lens has a refractive power;
the fifth lens has a negative refractive power, and an image-side surface of the fifth lens is a convex surface;
the sixth lens has a refractive power, and an image-side surface of the sixth lens is a concave surface;
the seventh lens has a refractive power,
f/EPD<1.5, where f is an effective focal length of the optical imaging system and EPD is an entrance pupil diameter of the optical imaging system.

2. The optical imaging system according to claim 1, wherein 1.2<TTL/f<1.6,
where TTL is a distance on the optical axis from the object-side surface of the first lens to an image plane of the optical imaging system and f is the effective focal length of the optical imaging system.

3. The optical imaging system according to claim 1, wherein −0.5<f/f5<0,
where f is the effective focal length of the optical imaging system and f5 is an effective focal length of the fifth lens.

4. The optical imaging system according to claim 1, wherein 0<T23/T12<1,
where T12 is a spaced distance on the optical axis between the first lens and the second lens and T23 is a spaced distance on the optical axis between the second lens and the third lens.

5. The optical imaging system according to claim 1, wherein 0.1<(CT2+CT3+CT4)/f<0.6,
where CT2 is a central thickness of the second lens on the optical axis, CT3 is a central thickness of the third lens on the optical axis, CT4 is a central thickness of the fourth lens on the optical axis and f is the effective focal length of the optical imaging system.

6. The optical imaging system according to claim 1, wherein 0.3<ΣCT/TTL<0.7,
where ΣCT is a sum of central thicknesses of the first lens to the seventh lens, and TTL is a distance on the optical axis from the object-side surface of the first lens to an image plane of the optical imaging system.

7. The optical imaging system according to claim 1, wherein 0.2<f2/(R1+R2)≤1.06,
where R1 is a radius of curvature of the object-side surface of the first lens, R2 is a radius of curvature of an image-side surface of the first lens, and f2 is an effective focal length of the second lens.

8. The optical imaging system according to claim 1, wherein 0.4<|R9/R10|<1,
where R9 is a radius of curvature of an object-side surface of the fifth lens and R10 is a radius of curvature of the image-side surface of the fifth lens.

9. The optical imaging system according to claim 1, wherein 4.33 mm≤tan (SemiFOV)×f<4.8 mm,
where SemiFOV is half of a maximal field-of-view of the optical imaging system and f is the effective focal length of the optical imaging system.

10. The optical imaging system according to claim 1, wherein 0.6<ImgH/|R5+R6|<1.3,
where ImgH is half of a diagonal length of an effective pixel area on an image plane of the optical imaging system, R5 is a radius of curvature of an object-side surface of the third lens and R6 is a radius of curvature of an image-side surface of the third lens.

11. An optical imaging system comprising, comprising a first lens, a second lens, a third lens, a fourth lens, a fifth lens, a sixth lens and a seventh lens, which are sequentially arranged from an object side of the optical imaging system to an image side of the optical imaging system along an optical axis of the optical imaging system,
wherein,
the first lens has a refractive power, and an object-side surface of the first lens is a convex surface;
the second lens has a positive refractive power;
the third lens has a refractive power;
the fourth lens has a refractive power;
the fifth lens has a negative refractive power, and an image-side surface of the fifth lens is a convex surface;
the sixth lens has a refractive power, and an image-side surface of the sixth lens is a concave surface;
the seventh lens has a refractive power, f/EPD<1.7, where f is an effective focal length of the optical imaging system and EPD is an entrance pupil diameter of the optical imaging system, and SAG22/SAG21<−0.2, where SAG21 is a distance on the optical axis from an intersection of an object-side surface of the second lens and the optical axis to a vertex of an effective radius of the object-side surface of the second lens, and SAG22 is a distance on the optical axis from an intersection of an image-side surface of the second lens and the optical axis to a vertex of an effective radius of the image-side surface of the second lens.

12. The optical imaging system according to claim 11, wherein 1.2<TTL/f<1.6, where TTL is a distance on the optical axis from the object-side surface of the first lens to an image plane of the optical imaging system and f is the effective focal length of the optical imaging system.

13. The optical imaging system according to claim 11, wherein −0.51f/f5<0, where f is the effective focal length of the optical imaging system and f5 is an effective focal length of the fifth lens.

14. The optical imaging system according to claim 11, wherein 0<T23/T12<1, where T12 is a spaced distance on the optical axis between the first lens and the second lens and T23 is a spaced distance on the optical axis between the second lens and the third lens.

15. The optical imaging system according to claim 11, wherein 0.1<(CT2+CT3+CT4)/f<0.6, where CT2 is a central thickness of the second lens on the optical axis, CT3 is a central thickness of the third lens on the optical axis, CT4 is a central thickness of the fourth lens on the optical axis and f is the effective focal length of the optical imaging system.

16. The optical imaging system according to claim 11, wherein 0.3<ΣCT/TTL<0.7, where ΣCT is a sum of central thicknesses of the first lens to the seventh lens, and TTL is a distance on the optical axis from the object-side surface of the first lens to an image plane of the optical imaging system.

17. The optical imaging system according to claim 11, wherein 0.2<f2/(R1+R2)≤1.06, where R1 is a radius of curvature of the object-side surface of the first lens, R2 is a radius of curvature of an image-side surface of the first lens, and f2 is an effective focal length of the second lens.

18. The optical imaging system according to claim 11, wherein 0 0.4<|R9/R10|<1, where R9 is a radius of curvature of an object-side surface of the fifth lens and R10 is a radius of curvature of the image-side surface of the fifth lens.

19. The optical imaging system according to claim 11, wherein 4.33 mm≤tan(SemiFOV)×f<4.8 mm, where SemiFOV is half of a maximal field-of-view of the optical imaging system and f is the effective focal length of the optical imaging system.

20. The optical imaging system according to claim 11, wherein 0.6<ImgH/|R5+R6|<1.3, where ImgH is half of a diagonal length of an effective pixel area on an image plane of the optical imaging system, R5 is a radius of curvature of an object-side surface of the third lens and R6 is a radius of curvature of an image-side surface of the third lens.

* * * * *

UNITED STATES PATENT AND TRADEMARK OFFICE
CERTIFICATE OF CORRECTION

PATENT NO. : 11,366,289 B2
APPLICATION NO. : 16/742453
DATED : June 21, 2022
INVENTOR(S) : Fujian Dai, Lin Huang and Yunbing Ji It is certified that error appears in the above-identified patent and that said Letters Patent is hereby corrected as shown below:

On the Title Page

Column 1, Item (30) Foreign Application Priority Data should be added, and under it should include:
--Aug. 19, 2019 (CN) .....................................201910762703.0--

Signed and Sealed this
Nineteenth Day of September, 2023

Katherine Kelly Vidal
*Director of the United States Patent and Trademark Office*